US011757561B2

(12) United States Patent
Whittaker

(10) Patent No.: US 11,757,561 B2
(45) Date of Patent: Sep. 12, 2023

(54) SYSTEM AND METHOD FOR INTERCEPTING UNMANNED AERIAL VEHICLES

(71) Applicant: Airshare, Inc., Ottawa (CA)

(72) Inventor: Richard Jonathan Whittaker, Ottawa (CA)

(73) Assignee: Airshare, Inc., Ottawa (CA)

( * ) Notice: Subject to any disclaimer, the term of this patent is extended or adjusted under 35 U.S.C. 154(b) by 0 days.

(21) Appl. No.: 16/476,793

(22) PCT Filed: Jan. 9, 2018

(86) PCT No.: PCT/CA2018/050018
§ 371 (c)(1),
(2) Date: Jul. 9, 2019

(87) PCT Pub. No.: WO2018/129615
PCT Pub. Date: Jul. 19, 2018

(65) Prior Publication Data
US 2019/0360783 A1    Nov. 28, 2019

Related U.S. Application Data

(60) Provisional application No. 62/444,492, filed on Jan. 10, 2017.

(51) Int. Cl.
*H04K 3/00* (2006.01)
*F41H 11/04* (2006.01)
(Continued)

(52) U.S. Cl.
CPC ............. *H04K 3/92* (2013.01); *B64C 39/024* (2013.01); *F41H 11/04* (2013.01);
(Continued)

(58) Field of Classification Search
CPC ...... F41H 11/02; F41H 11/04; F41H 13/0006; F42B 12/56; F42B 12/58; F42B 12/70
(Continued)

(56) References Cited

U.S. PATENT DOCUMENTS 5,814,753 A * 9/1998 Rieger .................... F42B 12/66
102/504
7,506,841 B2 * 3/2009 Duden ..................... B64G 1/002
428/305.5
(Continued)

FOREIGN PATENT DOCUMENTS

DE        60011745 T2 *  7/2001 ............. A63H 37/00
EP         0880433 B1 * 11/2002 ........... B29C 43/006
(Continued)

OTHER PUBLICATIONS

ADMET—Materials Testing Systems, Tensile Property Testing of Plastics, Nov. 28, 2007, MatWeb, pp. 1-2 (Year: 2007).*
(Continued)

*Primary Examiner* — Joshua E Freeman
*Assistant Examiner* — Benjamin S Gomberg
(74) *Attorney, Agent, or Firm* — Teitelbaum & Bouevitch; Neil Teitelbaum

(57) ABSTRACT

The invention provides a system and method for intercepting a target UAV by releasing a plurality of countermeasure (CM) objects in a projected path thereof to form a 3D countermeasure cloud. Pieces of flexible materials configured to become ensnared in the propellers of the target UAV or otherwise interfere with their ability to provide lift and thrust capabilities to the UAV. A UAV interception control system may track the target UAV and compute a location probability volume therefor using a modified Kalman filter to decide on a projected interception location and time.

8 Claims, 14 Drawing Sheets

(51) Int. Cl.
*B64C 39/02* (2023.01)
*G05D 1/00* (2006.01)
*F41H 13/00* (2006.01)

(52) U.S. Cl.
CPC ....... *F41H 13/0006* (2013.01); *G05D 1/0022* (2013.01); *H04K 3/41* (2013.01); *H04K 3/43* (2013.01); *H04K 3/827* (2013.01); *B64U 2201/20* (2023.01); *H04K 2203/22* (2013.01); *H04K 2203/36* (2013.01)

(58) Field of Classification Search
USPC .......................................... 102/505; 89/36.16
See application file for complete search history.

(56) References Cited

U.S. PATENT DOCUMENTS

| | | | | |
|---|---|---|---|---|
| 8,205,537 | B1 * | 6/2012 | Dupont | F41H 13/0006 |
| | | | | 89/1.34 |
| 8,375,837 | B2 * | 2/2013 | Goossen | F41H 13/0006 |
| | | | | 89/1.11 |
| 8,596,178 | B2 * | 12/2013 | Rogers | F41H 11/02 |
| | | | | 89/902 |
| 10,401,129 | B2 * | 9/2019 | Armstrong | F42B 12/58 |
| 10,435,153 | B2 * | 10/2019 | Klein | F41H 11/04 |
| 10,677,569 | B2 * | 6/2020 | Hoareau | F41B 11/80 |
| 10,689,109 | B2 * | 6/2020 | Wypyszynski | F41H 11/04 |
| 10,724,831 | B1 * | 7/2020 | Walker | F42B 12/56 |
| 11,022,408 | B2 * | 6/2021 | Klar | F41H 11/02 |
| 11,255,643 | B2 * | 2/2022 | Ang | F42B 12/58 |
| 2011/0005373 | A1 * | 1/2011 | Martinez | F42B 30/00 |
| | | | | 361/230 |
| 2011/0101097 | A1 * | 5/2011 | Olden | F42C 11/002 |
| | | | | 235/404 |
| 2015/0316345 | A1 * | 11/2015 | Brahler, II | F41B 11/72 |
| | | | | 124/73 |
| 2016/0023760 | A1 * | 1/2016 | Goodrich | G05D 1/12 |
| | | | | 244/10 |
| 2016/0376029 | A1 * | 12/2016 | Sekiya | F41B 5/1484 |
| | | | | 244/110 F |
| 2018/0094908 | A1 * | 4/2018 | Down | F41G 3/06 |
| 2018/0162530 | A1 * | 6/2018 | Klein | F41H 11/04 |
| 2019/0226815 | A1 * | 7/2019 | Matter | F42B 12/40 |
| 2019/0285388 | A1 * | 9/2019 | Klar | F41H 11/02 |

FOREIGN PATENT DOCUMENTS

| | | | | |
|---|---|---|---|---|
| EP | 3109586 | A1 * | 12/2016 | ............. F42B 12/66 |
| EP | 3540364 | A1 * | 9/2019 | ........... B64C 39/024 |

OTHER PUBLICATIONS

Thulasinath Raman Venkatesan, "What are some elastic material examples?", 4 years ago, Quora, p. 2 (Year: 2021).*

* cited by examiner

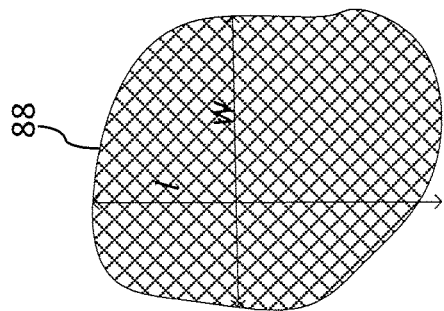
FIG. 4E
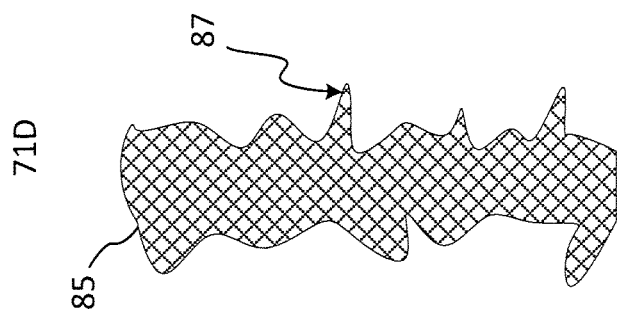
FIG. 4D
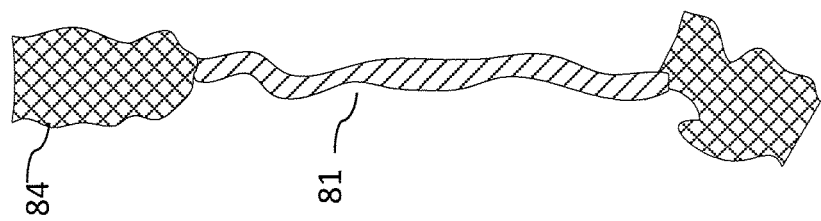
FIG. 4C
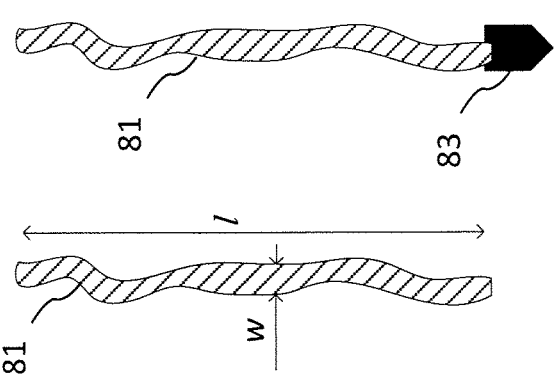
FIG. 4B
FIG. 4A

SYSTEM AND METHOD FOR INTERCEPTING UNMANNED AERIAL VEHICLES

RELATED APPLICATION DATA

This application is the national stage entry of International Application No. PCT/CA2018/050018 filed Jan. 9 2018, which claims priority to U.S. provisional application No. 62/444,492 filed Jan. 10, 2017. The entireties of these applications are hereby incorporated by reference.

TECHNICAL FIELD

Embodiments of the present invention relate to systems and methods for intercepting Unmanned Aerial Vehicles (UAVs).

BACKGROUND

The growing popularity of Unmanned Aerial Vehicles (UAVs) have raised public safety concerns over their intentional and unintentional use near people and critical infrastructure such as airports, nuclear power facilities, transmission lines, bridges, sports stadiums, and the like. Recently, airports around the world have incurred direct and indirect costs from unplanned airport closures as a response to observed UAV incursions. Airplanes have been damaged in flight by UAV incursions, posing a serious safety risk to passengers, crew and the general public. Similarly, privacy and security concerns exist for high profile individuals, gatherings of people, and property owners where UAVs can easily circumvent current security and privacy measures.

The prospect of using a relatively small UAV in a protected area is quite concerning to the security & defense community based on their experience with these in the field. They can be freely bought at a relatively small cost and can inflict serious harm to a target person, crowd, or infrastructure. Small UAVs can be used for spying, carrying biologically catastrophic payloads, weapons, and the like. A DJI Phantom 3, for example, can carry 500 g of C4, which translates to $3.25 \times 10^6$ joules of energy and can cause serious damage to a critical infrastructure.

Small UAVs pose a challenge to the conventional airspace system because of their size, maneuverability, typical flight altitudes; their wide-spread use by the public was not contemplated in the original airspace control framework. In a normally functioning airspace control system, interception responses to situations involving conventionally-operated aircraft are readily handled. For example, aircraft can be radar identified and confirmed easily as to deviations from their expected course, or potential violations to restricted airspace. Small UAVs, however, cannot be readily handled by the current airspace control systems. For example, UAVs cannot easily be radar identified; those who do detect a UAV incursion often have limited means to communicate with the national or local airspace management system or influence its operation. By the time an interception order is given, it is often too late. Furthermore, current interception orders result in scrambling fighter jets, which are ineffective in dealing with small, low-flying UAVs.

Approaches suggested heretofore for intercepting small UAVs include the use of encompassing nets (net guns, nets hung from an aircraft, nets with foam encasements, etc.), electronic jamming, electronic spoofing, or UAV destroying lasers. These approaches are typically expensive and may be impractical in many situations. Nets and lasers require an immense amount of kinetic energy, expensive targeting systems, and direct line of sight to be effective at any distance. Electronic countermeasures have the potential to disrupt surrounding legitimate, even critical or life-saving communications systems, and may trigger adverse events, for example in case of a UAV carrying a bomb. Furthermore, electronic countermeasures may only be conducted by duly authorized agent—noting that in many jurisdictions the communications authority is yet another separate jurisdiction from the aviation authority. Coordinating all of this to execute an interception order on a small UAV is impractical. A solution is therefore desirable which reduces the expense and energy required to deploy a countermeasure and avoids the adverse impacts to local communications infrastructure.

Accordingly it would be desirable to provide a method and system for efficient interception of UAVs entering a surveillance airspace that lessens at least some of the drawbacks of the earlier UAV interception systems.

SUMMARY OF THE INVENTION

Accordingly, an aspect of the present invention relates to a method for intercepting a target UAV comprising: a) detecting a target UAV entering a surveillance airspace, and b) deploying a plurality of countermeasure (CM) objects into a projected path of the target UAV, the CM objects configured to interfere with normal operation of one or more propellers of the target UAV so as to disrupt a lift or thrust characteristic of the target UAV. The deploying may comprise releasing the plurality of CM objects into the air at a target location to form a three-dimensional cloud of CM objects.

In various implementations the CM objects may comprise pieces of flexible material or materials configured to become ensnared in propeller blades of the one or more propellers of the target UAV so as to effect a negative torque thereon countering a motor torque, or to become ensnared in a protective cage of the one or more propellers so as to at least partially block an airflow thereto. The CM objects may be configured to cause the target UAV to undergo an automatic shutdown procedure or an automatic landing procedure. The plurality of CM objects may be packed in a projectile configured for launching toward a target location. In accordance with an aspect of the present disclosure, the method may further include: c) monitoring, by a computer system in communication with one or more UAV detection and tracking sensors, movements of the target UAV over a period of time to collect UAV location and movement data; d) computing, by the computer system, the projected path of the target UAV based on the UAV location and movement data; e) estimating, by the computer system, a location along the projected path where the target UAV may be intercepted by the CM cloud, and a projected interception time t corresponding thereto; f) computing, by the computer system, a location probability volume $Sp(t)$ for the target UAV that defines a three-dimensional (3D) range of probable locations of the target UAV at the projected interception time t; and, g) generating a CM deployment command upon meeting a condition in relation to the location probability volume $Sp(t)$.

A further aspect of the present disclosure provides a system for intercepting a target UAV, the system comprising a plurality of CM objects configured to interfere with normal operation of one or more propellers of the target UAV so as to disrupt a lift or thrust characteristic of the target UAV, and a CM delivery device for delivering and/or dispersing the plurality of CM objects into a projected path of the target UAV. In various implementations the CM delivery device may be in the form of, or include, a CM cannon or an aerial CM delivery vehicle. A CM delivery vehicle may include a projectile configured to carry the plurality of CM objects, and may also include an interception UAV that may be configured to carry the projectile or a CM dispersion device.

An aspect of the present disclosure relates to a countermeasure system which, when deployed, produces a three-dimensional (3D) distribution of individual countermeasure objects, which may be termed a countermeasure (CM) cloud. The volumetric distribution of the CM objects in the CM cloud and its density may be pre-determined, or may be varied dynamically. A firing criteria may be used to determine when to launch and subsequently deploy the CM objects. In some implementations the firing criteria may be met when a computed hit probability reaches a predefined threshold. The hit probability may be a function of a volumetric overlap between a location probability volume and a countermeasure deployment volume, and may also depend on the density of the CM deployment volume. In some implementations the firing criteria may include a condition that an expected density of the CM cloud exceeds a predefined threshold, and/or the 3D overlap of the UAV location probability volume and the CM deployment volume exceeds, or is not smaller than, a predefined threshold. In some implementations the firing criteria may include computing a ratio of the CM deployment volume to the UAV location probability volume, and determining whether said ratio meets a pre-defined overlap threshold. The density and volume of the CM cloud may be varied, for example by adjusting a deployment charge, thereby enabling to adaptively adjust the method of interception to different classes of offending UAVs.

An aspect of the present disclosure provides a method for UAV interception comprising: a) detecting, by a computer system in communication with one or more UAV detection and tracking sensors, a target UAV entering a surveillance airspace; b) monitoring, by the computer system in communication with one or more UAV detection and tracking sensors, movements of the target UAV over a period of time to collect UAV location and movement data; c) estimating, by the computer system based on the UAV location and movement data, a projected interception time when the target drone may be intercepted by a countermeasure (CM); d) computing, by the computer system, a location probability volume $Sp(t)$ for the target drone that defines a three-dimensional (3D) range of probable locations of the target drone at the projected interception time t; and, e) deploying the CM into at least one of the probable locations of the target drone upon meeting a condition related to the location probability volume $Sp(t)$.

An aspect of the present disclosure provides a method for intercepting a target UAV, the method comprising: a) tracking, by a computer system in communication with one or more UAV detection sensors, movements of the target UAV over a period of time while the target UAV is in the surveillance zone; b) computing, by the computer system, a projected path of the UAV; c) estimating, by the computer system, a location along the projected path where the target UAV may be engaged by a countermeasure, and a corresponding projected interception time when the target UAV may be engaged by the countermeasure; d) computing, by the computer system, a location probability volume $Sp(t)$ for the target UAV that defines a three-dimensional (3D) range of probable locations of the target UAV at a projected interception time t; and, e) deploying the countermeasure at least one of the probable locations of the target UAV once a countermeasure deployment criterion that depends on the location probability volume $Sp(t)$ is satisfied.

In some implementations the deploying may comprise releasing the plurality of CM objects into the air at a target location to form a cloud of the CM objects that descends through the projected path of the target drone.

In some implementations computing the probability volume $Sp(t)$ comprises simulating possible movements of the target drone while varying at least one parameter representing a control input for the target drone within a pre-defined range of control inputs.

In some implementations the simulating comprises computing a plurality of possible locations of the target drone at the projected interception time t, each of the possible locations corresponding to a different value of the at least one parameter within the pre-defined range of control inputs.

In some implementations the method may comprise computing the projected path of the target drone using default values for a plurality of control inputs for the target drone.

In some implementations the method may comprise collecting, by the computer system, drone classification data for classifying the target drone into one of a plurality of pre-defined drone classes to determine the range of the control inputs possible for the target drone.

In some implementations the method may include: computing, and periodically updating, a time to target value t2t representing a duration of time the CM needs to reach the projected interception location, and, periodically updating the location probability volume $Sp(t)$ for the target drone time accounting for a current time to target value t2t.

In some implementations the method may include generating, by the computer system, the CM deployment command based at least in part on a size of the location probability volume $Sp(t)$ for the target drone.

In some implementations the method may include deploying a plurality of CM objects in the air so as to form a cloud of CM objects in the projected path of the target drone, the CM objects configured to interfere with normal operation of one or more propellers of the target drone so as to disrupt a lift or thrust characteristic of the target drone, method further including generating, by the computer system, the CM deployment command when the computed probability volume $Sp(t)$ satisfies a pre-determined criterion in relation to one or more parameters of the CM cloud. In some implementations the method may include generating the command when the CM cloud at least matches the computed probability volume $Sp(t)$ in size at the projected interception time.

In some implementations the method may include: computing an overlap of the location probability volume $Sp(t)$ with the CM cloud, and generating the CM deployment command once the overlap satisfies a predetermined criterion.

In some implementations the probability volume $Sp(t)$ may be computed based at least in part on the drone classification data.

In some implementations computing the probability volume $Sp(t)$ and the projected path of the drone comprises using a recursive Kalman filter for a plurality of values of the at least one parameter representing the control inputs for the target drone.

In some implementations the method may include launching a CM delivery projectile carrying a plurality of CM objects from an interceptor drone or the ground.

In some implementations the method may include releasing the CM objects at a location above the projected path of the target drone.

In some implementations the CM delivery projectile may be equipped with a CM launching mechanism configured to select from two or more CM release options, the method further including selecting one of the CM release options in dependence on a size of the computed probability volume Sp(t).

An aspect of the present disclosure provides a UAV interception system comprising: one or more drone detection sensors configured to detect a target drone in a surveillance area and to generate drone location and movement data; a countermeasure (CM) delivery projectile comprising configured to deploy one or more CM objects into a projected path of the target drone, wherein the one or more CM objects are configured to interfere with normal operation of one or more propellers of the target drone so as to disrupt a lift or thrust characteristic of the target drone; and, a projectile launch system configured to launch the CM delivery projectile toward a projected interception location of the target drone responsive to a CM deployment command.

In some implementations the system may include an interceptor drone carrying the CM delivery projectile and the projectile launch system.

In some implementations the system may include a drone communication module configured to wirelessly communicate the CM deployment command to the interceptor drone.

In some implementations the system may include a charged container comprising a plurality of CM objects and configured to disperse the CM objects in the air when activated, wherein the CM delivery projectile comprises a CM ejector configured to eject the container in response to a CM ejection command or to drop the plurality of CM objects for dispersing over a target location along the projected path of the drone.

In some implementations the CM objects may comprise objects configured to become ensnared in propeller blades of the one or more propellers of the unauthorized drone so as to stop or slow down the rotation of the propeller blades, and/or to become ensnared in a protective cage of one of the one or more propellers of the target drone so as to at least partially block airflow to the propeller blades.

In some implementations the CM delivery projectile comprises a CM ejector configured to select from two or more CM ejection options that differ in at least one parameter of the CM cloud.

In some implementations the system may include a computer-implemented interception control system (ICS) comprising: a tracking system (TS) configured to communicate with the one or more drone detection sensors and to track movements of the target drone over a period of time using the drone location and movement data; a flight simulation system (FSS) configured to determine the projected interception location; and, a CM deployment control system configured to generate the CM deployment command for communicating to the projectile launch system.

In some implementations the ICS may comprise one or more computers programmed to: a) compute, and periodically update, the projected path of the target drone said projected path based at least in part on the drone location and movement data; b) determine, and periodically update, a time to target value t2t representing the time required for the CM objects to be delivered to a projected location of the target drone; c) compute a location probability volume Sp(t) for the target drone at a projected interception time t=t0+t2t, where t0 is a time instance at which a command for launching the CM delivery projectile, or to release the CM objects from the projectile, may be generated, wherein the location probability volume Sp(t) defines a three-dimensional (3D) range of probable locations of the target drone at the projected interception time t; and, d) generating the command to launch the CM delivery projectile, or to release the CM objects from the CM delivery projectile, once the computed drone probability volume Sp(t) for the projected interception time t satisfies a pre-determined firing criterion in relation to the cloud of CM objects.

In some implementations the system may further include an interceptor drone carrying the CM projectile and the projectile launching system, wherein the one or more computers comprise a processor disposed in the interceptor drone and configured to: iteratively compute, in communication with the one or more drone detection sensors, the projected path of the drone relative to the interceptor drone and the location probability volume Sp(t) for the projected interception time, and generate the command to launch the CM projectile when the computed location probability volume Sp(t) for the projected interception time satisfies the pre-determined firing criterion.

In some implementations of the system the one or more computers may comprise a processor disposed at the CM projectile and configured to: iteratively compute, in communication with the drone detection sensors, the projected path of the target drone relative to the CM projectile and the drone probability volume for the projected hit locations, and, generate the command to release the CM objects from the CM projectile at a target location.

BRIEF DESCRIPTION OF THE DRAWINGS

Embodiments disclosed herein will be described in greater detail with reference to the accompanying drawings, which may be not to scale and in which like elements are indicated with like reference numerals, and wherein:

FIG. 4A illustrates a CM object in the form of a ribbon;

FIG. 4B illustrates a CM object in the form of a ribbon with a weight at one end thereof;

FIG. 4C illustrates a composite CM object formed of a ribbon with pieces of a different material attached at the ends thereof;

FIG. 4D illustrates a CM object in the form of a flexible sheet of irregular form with protrusions at the edges;

FIG. 4E illustrates a CM object in the form of a piece of film sized to be caught against a propeller cage for blocking airflow to the propeller;

DETAILED DESCRIPTION

Figure 1:
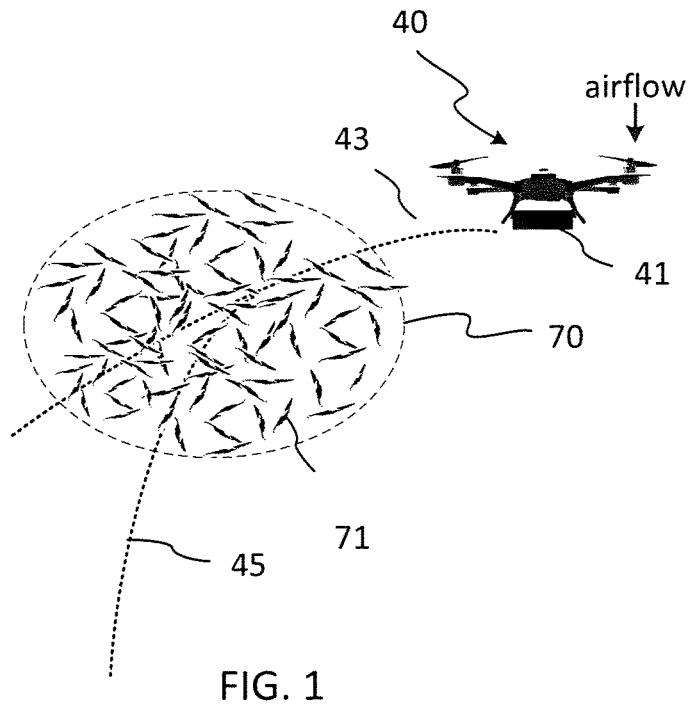
FIG. 1 is a schematic diagram illustrating the interception of an authorized UAV by a countermeasure cloud.

In the following description, for purposes of explanation and not limitation, specific details are set forth, such as particular circuits, sub-systems, optical and circuit components, mechanical elements, assemblies, or techniques, etc. in order to provide a thorough understanding of the present invention. However, it will be apparent to one skilled in the art that the present invention may be practiced in other embodiments that depart from these specific details. In other instances, detailed descriptions of well-known methods, devices, and tools are omitted so as not to obscure the description of the present invention. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Note that as used herein, the terms "first", "second" and so forth are not intended to imply sequential ordering, but rather are intended to distinguish one element from another unless explicitly stated. Similarly, sequential ordering of method steps does not imply a sequential order of their execution, unless explicitly stated. The word 'using', when used in a description of a method or process performed by a computer system, is to be understood as referring to an action performed by the computer system or by a component thereof rather than by an external agent. The term "projectile" encompasses passive projectiles and self-propelled missiles that may be actively guided by an external control system or may be autonomously guided. The terms "UAV" and "drone" are used herein interchangeably. The term 'periodically' as used herein does not presume the exact periodicity of a respective process or acts unless otherwise is explicitly stated, but simply indicates that the act repeats at time intervals that may or may not be equal. The terms "connected to", "coupled with", "coupled to", and "in communication with" may be used interchangeably and may refer to direct and/or indirect communication of signals between respective elements unless the context of the term's use unambiguously indicates otherwise. The term 'matrix' as used herein may encompass vectors, which may be viewed as a single-column or single-row matrices. It will be appreciated that matrices and matrix operations are used in the current disclosure merely as a description device to facilitate understanding of the underlying processes and operations, and that the corresponding processes and operations may be implemented in software and/or digital hardware in a variety of ways, which may or may not include the use of arrays, as would be known to those skilled in the art.

Unless specifically stated otherwise and/or as is apparent from the following discussions, terms such as "processing," "operating," "computing," "calculating," "determining," or the like, refer to the action and processes of a computer, data processing system, logic circuit or similar processing device that manipulates and transforms data represented as physical, for example electronic, quantities.

In the following description, reference is made to the accompanying drawings which form a part thereof and which illustrate several embodiments of the present invention. It is understood that other embodiments may be utilized and structural and operational changes may be made without departing from the scope of the present invention. The drawings include flowcharts and block diagrams. The functions of the various elements shown in the drawings may be provided through the use of dedicated data processing hardware such as but not limited to dedicated logical circuits within a data processing device, as well as data processing hardware capable of executing software in association with appropriate software. When provided by a processor, the functions may be provided by a single dedicated processor, by a single shared processor, or by a plurality of individual processors, some of which may be shared. The term "processor" should not be construed to refer exclusively to hardware capable of executing software, and may implicitly include without limitation, logical hardware circuits dedicated for performing specified functions, digital signal processor ("DSP") hardware, application specific integrated circuits (ASICs), field-programmable gate arrays (FPGAs), read-only memory ("ROM") for storing software, random access memory ("RAM"), and non-volatile storage.

Referring to FIG. 1, in accordance with one aspect of the present disclosure a target UAV 40 entering a protected airspace may be intercepted by deploying a plurality of countermeasure (CM) objects 71 in the path 43 of the UAV, so as to form a CM cloud 70 occupying a three-dimensional (3D) volume $V_{CM}$. In some embodiments, the deploying may include releasing the plurality of CM objects at a target aerial location above the projected path of the target UAV 40, and letting them descend into the projected path 43 of the target UAV 40, which may be timed to engage the target UAV as the CM objects 71 descend into its path. When UAV 40 enters CM cloud 70 of sufficient CM density, it comes in contact with one or more CM objects 71, which are configured to interfere with normal operation of the UAV propellers so as to disrupt the thrust and/or lift characteristic of the target UAV 40, thereby causing the target UAV to descend to the ground, as schematically illustrated by a descend path 45. In some embodiment the CM objects 71 are configured so that this disruption causes the UAV 40 to descend to the ground in a graceful manner so as to avoid damage to the UAV 40 and/or its load 41 upon contact with the ground, and to avoid damage to people or objects on the ground. In some embodiments the CM objects 71 get ensnared by the UAV propellers, slowing them down to an angular velocity that is insufficient for the UAV to stay airborne. In some embodiments the CM objects 71 may at least partially block airflow to/from one or more of the UAV's propellers, thereby at least partially negating the lift force exerted upon the UAV by the rotating propeller, thereby causing the target UAV to descend. The actual size of the CM cloud 70 and the number of CM objects therein may depend on a particular implementation, and may vary depending on, for example, the size and other properties of the CM objects, the mode of their deployment, the type of the UAV to be intercepted, among other particularities. In some embodiments, the CM cloud 70 may have a minimum linear dimension of at least 1.5 meters in any direction, and may include from as few as five to as many as a hundred or more distinct CM objects.

Figure 2:
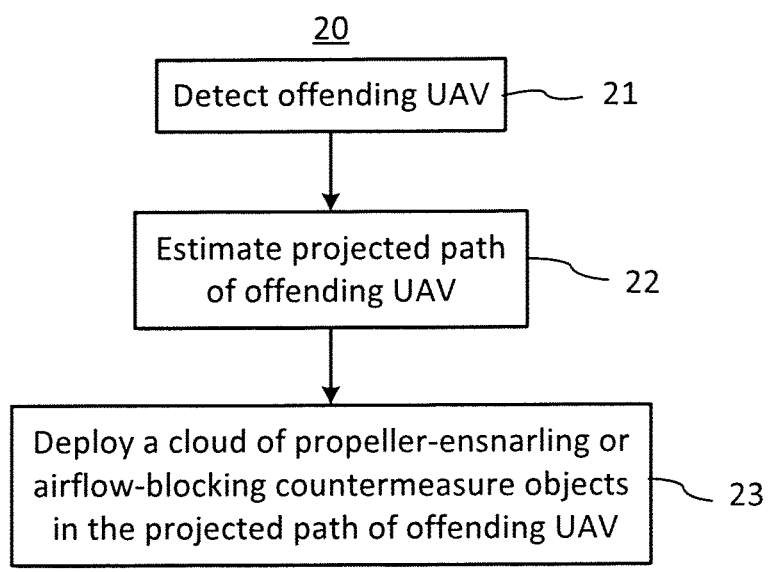
FIG. 2 is a general flowchart of a UAV interception method using a cloud of countermeasure objects designed to ensnare or otherwise slow down the UAV propellers.

FIG. 2 illustrates general steps of a method 20 of UAV interception in accordance with an embodiment of the present disclosure. In the illustrated embodiment method 20 may include a step or operation 21 of detecting the offending UAV 40 when it enters a protected area under surveillance, a step or operation 22 of estimating a projected path 43 of the UAV 40, and a step or operation 23 of deploying a cloud of propeller-ensnaring or airflow-blocking countermeasure objects in the projected path 43 of the offending UAV 40. The CM objects 71 may be configured so that the CM cloud 70 persists in the path of the UAV at least partly for a desired duration of time, for example for a few seconds.

Accordingly an aspect of the present disclosure relates to a system for UAV interception that includes a plurality of CM objects that are configured to interfere with normal operation of one or more propellers of the target UAV so as to disrupt a lift or thrust characteristic of the target UAV, and, an aerial delivery vehicle or vehicles for delivering the plurality of CM objects into the projected path of the target UAV. The aerial delivery vehicle may be for example in the form of, or include, a CM delivery projectile and/or an authorized UAV.

In at least some embodiments the CM objects 71 may be in the form of, or include, pieces of thin flexible material that are sufficiently light and have aerodynamic properties that cause them to slowly descend after being released in the air, rather than quickly fall to the ground with acceleration, so as to maximize the time they remain in a vicinity of the projected path of the target UAV. In example embodiments they may be configured to quickly reach a terminal descent velocity of at most 10 m/sec, or preferably less than 3 m/sec, or even more preferably at about or less than 1 m/s, after being released in the air. Generally, the acceleration a(t) of an object in freefall may be described by the following equation (1):

$$a(t)=g-D/m \qquad (1)$$

where g is the acceleration due to gravity, m—the mass of the object, and D is the aerodynamic drag force that may be described by equation (2):

$$D=0.5 \cdot Cd \cdot \rho \cdot v^2 \cdot A_e \qquad (2)$$

where $\rho$ is the air density, v is the velocity of the object, $A_e$ its effective area in the fall, and Cd is the coefficient of drag of the object. The terminal descent velocity $v_T$ is reached when the right hand side of equation (1) is zero, and it is the smaller the lower is the mass m and the greater is the effective area $A_e$ of the object in freefall and its drug coefficient Cd:

$$v_T = \sqrt{\frac{2gm}{Cd \cdot \rho \cdot A_e}} \qquad (3)$$

Accordingly, CM objects 71 may be substantially two-dimensional pieces of light flexible material, configured to have a relatively high ratio of the effective area to mass $A_e/m$ to reduce its terminal descend velocity $v_T$. In some embodiments the CM objects 71 may be selected so as to have an aerodynamic drag coefficient Cd in freefall equal or greater than 0.075, for example in a range from 0.075 to 0.75. The term "two-dimensional" (2D) refers herein to objects which thickness d is much smaller, typically by a factor of at least 10 or greater, than its characteristic length l and width w. The term "one-dimensional" (1D) may be used herein to refer to objects which thickness d and width w are of the same order of magnitude and both much smaller than its length l. The length dimension is understood as the dimension of maximum size, so that l≥w>>d. The surface area A of a CM object can be estimated as $l \cdot w_{av}$, where $w_{av}$ is an average width of the CM object, and $A \geq A_e$. In one embodiment the size, shape, and weight of the CM objects 71 may be selected so that the cloud 70 they form after being released, or at least a part thereof, remain in the air in a relevant vicinity of the projected path 43 of the UAV 40 for a duration of time $t_p$, termed CM persistence time, of a few seconds or longer, for example about 2-3 seconds or longer, or at least one second or greater in some embodiments. The relevant vicinity of the projected path of the UAV may refer to a location probability volume Sp(t) of the target UAV, as described hereinbelow.

Figure 3A:
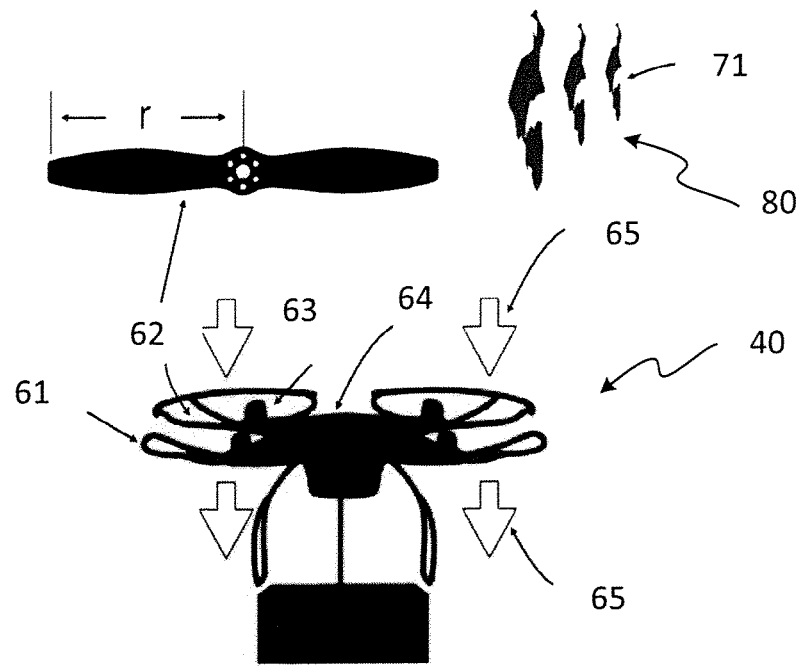
FIG. 3A is a schematic diagram of a UAV, a UAV propeller blade, and example CM objects of three different sizes.
Figure 3B:
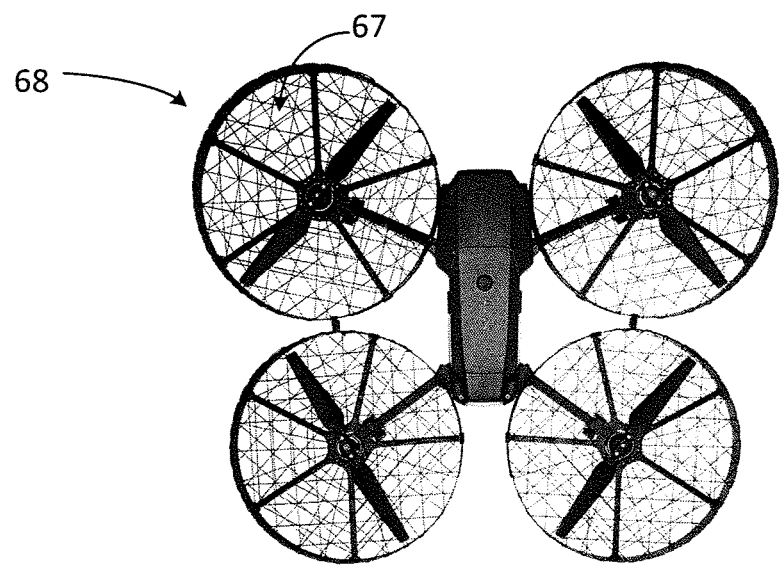
FIG. 3B is a schematic top view of a quadcopter UAV with protective propeller cages.

Referring to FIG. 3A, there is illustrated an example small UAV 40 with a body 64, one or more motors 63, and one or more propellers 62 with a radius, i.e. the length of a blade, r. UAV 40 may be optionally equipped with propeller guards or cage 61. An embodiment of a UAV with a protective propeller cage 67 is also illustrated in FIG. 3B. A typical UAV may have several propellers 62, each typically driven by its own motor 63. When in flight, n-th motor 63 applies torque $T_m(n)$ to rotate its propeller 62, which draws airflow through the rotating propellers as schematically illustrated by arrows 65; here index 'n' indicates a particular motor/propeller pair. The action of the airflow 65 on each propeller creates lift and thrust forces on the UAV. In equilibrium propeller 62 is spinning at a constant angular velocity $\omega_m$, and the motor torque $T_m(n)$ is balanced out by a torque $T_a(n)$ due to aerodynamic forces acting on the propeller 62:

$$T_m(n)+T_a(n)=0, \qquad (4)$$

where $T_a(n)$ represents the combine effect on the n-th propeller of the vector sum of aerodynamic forces, such as induced drag and parasitic drag, acting on the propeller opposite to $T_m$. To maintain equilibrium, the motor must vary the torque $T_m$ to match the aerodynamic forces, up to a limit $T_{max}$ defined by the motor used.

FIG. 3A also schematically illustrates a plurality 80 of CM objects 71, which may be of different sizes, and which may be drawn in by the airflow 65 towards the propellers 62. A CM object 71 may be configured to disrupt the equilibrium described by equation (4) when ensnared by one or more of the propellers in a manner that results in an additional CM-related torque Tc countering the motor torque $T_m$, which may be referred to as negative relative to the motor torque $T_m$. When ensnared by one of the UAV propellers 62, or any rotating feature of the motor associated with the propeller, a CM object 71 may exert a counter-force Fc on the propeller or propellers counteracting the motor torque $T_m$ and causing it to stop or slow down. A torque exerted on a propeller 62 by a force Fc associated with an ensnared CM object acting at angle θ to a propeller blade at a radial distance q from an axis of rotation can be computed in accordance with equation (5):

$$|Tc|=|Fc|*|q|*\sin(\theta), \qquad (5)$$

If a counter-torque Tc exerted by a CM object caught by the rotating propellers is sufficient to cause the angular velocity of the propeller 62 to be reduced to zero, or to a non-zero angular velocity that is insufficient for the UAV to provide adequate lift to keep it upright, the UAV would no longer stay airborne. UAV motors 63 typically have a maximum torque limit $T_{max}$ that they cannot exceed; accordingly, CM objects 71 may be designed so that the counter-torque Tc exerted by an ensnared CM object is likely to match or exceed $T_{max}$ in magnitude.

Since exceeding the maximum torque limit $T_{max}$ may damage the motor or the propeller, or similarly cause a fire, some UAV models may be factory-programmed to initiate a motor shut-off, possibly in a manner that lead to a graceful landing of the UAV, when led to apply a torque exceeding $T_{max}$, as a precautionary measure. For some UAV models $T_{max}$ may refer to a torque threshold set just below a maximum torque rating of the motor to provide for a safety margin. Embodiments of the present disclosure may take advantage of this feature to cause the UAV to initiate the motor shut-off or auto-land due to interactions with the CM objects, which may facilitate a graceful decent of the UAV to the ground.

Accordingly in some embodiments the CM objects 71 may be configured to be ensnared by one or more of the rotating propellers 62, so as to exert thereon a counter-torque that at least equals or exceeds the maximum torque $T_{max}$ that motor 63 may apply to its propeller 62. In some embodiments CM objects 71 may be in the form of pieces of a thin flexible film or sheet, a ribbon, or a string of a flexible material. The material and length of the CM objects may be selected so that, once the CM object comes in contact with a rotating propeller 62, or any rotating feature thereof such as for example a rotating shaft of the propeller's motor 63, it may be caught by, and bent about or against that feature, e.g. the propeller's blade, motor's shaft, or any rotating component of the propeller motor, thereby applying a degree of counter-torque Tc upon the propeller or propellers. That counter-torque may be stronger when the CM object is configured so that it is likely to get also simultaneously caught by another UAV feature, such as another propeller 62 or a feature of the UAV body 64.

In some embodiments the CM objects 71 may be in the form of flexible and/or elastic chaff that may be of regular or irregular shape and may be sized to bypass propeller guards or cage of the offending UAV. When ensnared between two propellers as they rotate, or a propeller and a non-moving feature of the UAV's body 64, the elastic chaff may become stretched by the rotating propeller thereby applying a tensile stress force upon the propeller to create the torque Tc counter to the angular momentum of the UAV motor to disable or slow down the propellers.

FIGS. 4A-4E schematically illustrate example CM objects 71, or chaff, that may be used in embodiments of the present disclosure to intercept an UAV. In some embodiments a CM object may be in the form of a ribbon 81 of length l and width w, as illustrated in FIG. 4A. By way of example, the width w of ribbon 81 may be in the range from 0.1 cm to 5 cm, but may also be outside of that range. In some embodiments the width w may be selected so that the ribbon 81 could bypass the protective cage or guards of the UAV propellers when falling in a vertical orientation. In one embodiment ribbon 81 may have a weight 83 attached to an end thereof, as illustrated in FIG. 4B, to facilitate a vertical orientation of the CM object in freefall and increase the likelihood of penetrating the protective cage 67 of the UAV's propellers, if present. In some embodiments a CM object 71 may be in the form of a piece 85 or 88 of a flexible film or sheet, which may be of regular or irregular form, as illustrated in FIGS. 4D and 4E. It may have regular or irregular protrusions 87 to facilitate ensnaring by the propellers and/or features of a UAV's body. In some embodiments ribbon 81 or 85 may be made of an elastic material or materials; in other embodiments the ribbon or sheet may be inelastic or include elastic and inelastic sections or portions.

Referring to FIG. 4C, in some embodiments a CM object may be in the form of a ribbon 81 of a first material with a piece or pieces of a second material 84 attached at one or both ends thereof. In some embodiments the second material attached at both ends may be heavier than the first material and may facilitate the horizontal orientation of the CM object in freefall. In some embodiments the second material may have a greater friction coefficient with the material of the UAV propellers and/or UAV body than the first material, in order to facilitate being ensnared on a feature of the UAV. In some embodiments the first material may be lighter and/or more elastic than the second material. In some embodiments the material of the middle section may be non-elastic, such as for example a piece of rope, a fishing line or the like, optionally holding together pieces of material having a greater traction with the materials of UAV propellers and/or body, which may also be more elastic. By way of example, ribbon 81 may be made of latex, which is light and highly elastic, while end pieces 84 may be made of thin rubber sheets, which has a greater friction with propellers made of plastic than latex.

The CM objects may be configured to preferentially fall in either a vertical orientation, which is advantageous for bypassing propeller's guards or penetrating a protective cage of the UAV propellers, or in a horizontal orientation. Falling in the horizontal orientation may be advantageous for intercepting a UAV without a protective propeller cage, as it may increase the likelihood of the CM object being ensnared simultaneously by two rotating propellers of the target UAV, or one of the propellers and another structural feature of the target UAV, which then causes the CM object to exert the negative torque on the propeller countering the motor torque. The CM object of the type illustrated in FIG. 4C may facilitate the horizontal freefall orientation, with the center section 81 functioning as a sail.

Figure 4F:
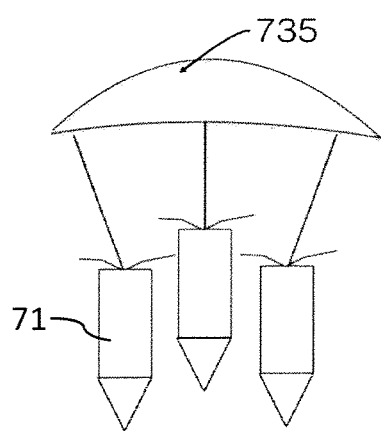
FIG. 4F illustrates a plurality of CM objects tethered to a parachute.
Figure 4G:
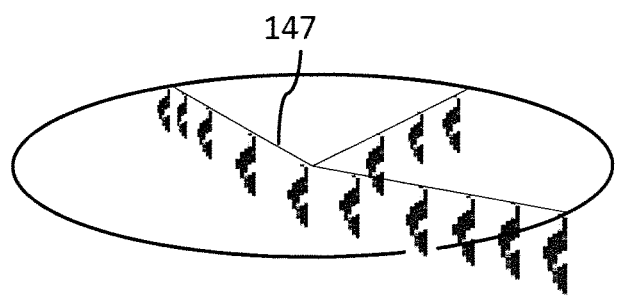
FIG. 4G illustrates a plurality of CM objects tethered along radii of a ring structure.

In some embodiments the plurality of CM objects 71 released in the air, and the corresponding CM cloud 70, may include a combination of CM objects of different shapes and/or configurations, such as those illustrated in FIGS. 4A-4E, but not limited thereto. It will be appreciated that possible CM objects are not limited to those illustrated in FIGS. 4A-4E, and many other types of CM objects or chaff may be capable of being deployed to interfere with normal operation of the UAV propellers, including but not limited CM objects in the form, or including, pieces of a string or a rope or a fishing line. In some embodiments the CM objects may fall separate from each other after being released. In other embodiments several CM objects 71 may be commonly tethered to each other or to a common member, such as a parachute 735, as schematically illustrated in FIG. 4F, or for example to a radial string of a wire ring, as illustrated in FIG. 4G, or in one of many other configurations that may facilitate the catchment of one or more of the CM objects by the target UAV. To further facilitate ensnaring by a rotating propeller of the target UAV, each or at least some of the CM objects may have at least one free end even when commonly tethered.

In some embodiments the CM objects may be of sufficient length to be wound about a UAV propeller a number of times to provide for a greater traction surface and thus greater friction with the propeller or a rotating part of the motor, so that the friction force of the CM object provides sufficient torque Tc to overcome the maximum motor torque $T_{max}$. For highly elastic CM objects, wounding multiple times may also facilitate more graduate increase in the counter-torque Tc, which may be advantageous for a graceful interception. The length l of a CM object 71 may then be chosen to be at least equal to a first length Lc that can be estimated as a sum of a CM intake length and a CM winding length, as may be estimated by the following equation (6):

$$Lc=(\omega/p)^{-1} \cdot (v_T+Cd \cdot v_d)+(2\pi \cdot q \cdot j), \tag{6}$$

where p is the number of blades on the propeller, $\omega$ is the instantaneous angular velocity of the propeller measured in revolutions per second (RPS), $v_T$ is the freefall velocity of the countermeasure, Cd is the coefficient of drag of the countermeasure, $v_d$ is the velocity of the air at the intake of the propeller, and j is the number of windings of the countermeasure around the motor axis at an average distance q from the centre of rotation that is required to overcome the maximum torque $T_{max}$ of the motor. By way of example, a popular drone DJI Phantom 3 has four motors, each with a two-bladed propeller. Each propeller blade has a length 12 cm, for a total of 24 cm per motor. When hovering, each motor spins at approximately 7,000 RPM, or about 117 RPS. With the thrust intake velocity about 600 cm/s, and a CM object falling at $v_T$=30 cm/s, the CM intake length, as given by the first term in equation (6), is negligible. For example, a CM object wound 3 times at 4 cm away from the propeller axis would yield the first length Lc of 18.8 cm.

In some embodiments the CM objects may be of length l sufficient for the CM objects to be caught at the same time by a propeller 62 and another feature of the UAV, such as a feature of the UAV body 64, another propeller 62, the propeller's shaft, the rotating motor housing, or the protective guard or cage 67, an antenna, and the like. In some embodiments the length l of the CM objects 71 may be at least half of the propeller radius r, or preferably equal or exceed the propeller radius r. In some embodiments the length l of the CM objects 71 may be at least equal to a distance between axes of two of the UAV propellers, or preferably exceeding that distance by 50% or more, so that the CM object may be ensnared simultaneously by two propellers. By way of example, for a typical quadcopter UAV the length of a CM object may be in the range from 10 cm to 50 cm, or in some cases it can be as small as 5 cm, and may also be smaller than 5 cm or greater than 50 cm in some instances. To decrease the likelihood of becoming ensnared in a protective cage or guard of a UAV propeller, in some embodiments the width w of a CM object may be smaller than the propeller radius r.

Further in relation to embodiments wherein the CM objects 71 are configured to get ensured by the propellers, the CM objects 71 may be made of a material with a tensile strength sufficient to exert torque on the rotating propeller that exceeds the motor torque limit $T_{max}$ of a propeller motor of the target UAV when the CM object is ensnared by the propeller. The elasticity of CM objects 71 may be chosen so that they do not damage the propellers when ensnared by the UAV in flight, but cause their graceful slowdown rather than an abrupt stop. In some embodiments the CM objects may be configured to exert upon the propeller a counter-torque Tc that matches or slightly exceeds the maximum motor torque $T_{max}$, causing the angular velocity of the propeller $\omega_p$ (n) to be gracefully reduced to a level below what is required for the UAV to stay airborne, and causing the UAV to descend gracefully so as to avoid causing undesired damage to people or objects below, or to the UAV body 64, propellers, motors, payload, and thereby reducing a probability of automatic self-destruct or any other action triggers. The graceful nature of the intercept may also be facilitated by causing the target UAV to initiate an automated landing or even an all-motor shut-off procedure to avoid motor damage; such an automated shut-off may be initiated when at least one UAV motor is let to apply the torque Tm equal to greater $T_{max}$ to counteract the additional torque Tc due to the ensnared CM object. The graceful character of the intercept may be further facilitated by fastening some or all of the CM objects to a descent-arresting device, such as a parachute 735, which ensures a graceful descent of the ensnared UAV.

In some embodiments the CM objects may be highly elastic so that when one of them is being stretched between two rotating propellers or a rotating propeller and another structural feature of the target UAV, the critical torque matching $T_{max}$ is not reached until the ensnared portion of the CM object is significantly stretched, for example by 10% or more, which facilitates graceful interception. In some embodiments the CM objects 71 may be configured so that the counter-torque Tc applied by an ensnared CM object 71 to the propeller 62 increases at a rate dTc/dt that does not exceed a predefined value, which may allow the target UAV to undergo the motor shut-off procedure before the CM object exerts a force on the propeller capable of breaking it. By way of example, for a motor 63 with a maximum torque $T_{max}$=30 N·m, a countermeasure induced torque Tc may be increasing at a rate dTc/dt=15 N·m/s as the CM object is winded about the propeller's axis and stretched. To keep airborne, UAV 40 has to increase the torque Tm on the motor 63 at the same rate to maintain the angular velocity of the propellers at hovering, reaching $T_{max}$ after 2 seconds, which may cause the UAV to initiate a shutdown, or otherwise slow down the propellers and cause the UAV to gradually descend.

In some embodiments the CM objects 71 may be made of a material or combination of materials that is/are sufficiently strong to withstand the pulling force of the propeller motor when ensnared by the propeller. In some embodiments the material of the CM objects may be such that they can be stretched or elongated by 10% or more without breaking or tearing. The ability of a material or an object to withstand loads tending to elongate is defined by its ultimate tensile strength Sc, which is a maximum tensile stress that the material can withstand without breaking or tearing. The material and cross-sectional area Ac=w·d of a CM object of width w thickness d may be selected to ensure that the maximum stress force Fc=Sc·Ac at tearing exceeds a maximum motor force, $F_{max}=T_{max}/q$ that a motor 63 may apply to the CM object 71 entangled at a radial distance q from the propeller axis:

$$Sc \cdot Ac > T_{max}/q \tag{7}$$

By way of example, a CM object 71 in the form of a 0.35 mm thick latex ribbon of 18.8 cm length and 5 cm width, Ac=5.0.035 cm², withstands 25.8 N of force at a maximum elongation of 250%. Such a ribbon, when caught between a propeller and another feature of a UAV, is capable of providing sufficient tensile force to overcome a motor with a maximum torque of 0.5 N*m when acting at a point along a propeller about q=2 cm or more or away from the propeller's axis. Further by way of example, a latex resistance band, common party balloon, or even pieces of a Polyethylene film of suitable size, such as a cut up plastic bag, may each exhibit a planar stress force that satisfies equation (7) for a typical UAV.

In some embodiments the thickness d of the CM objects may be suitably small to reduce weight, increase airborne persistence, and increase surface contact with the leading edge of the UAV propeller 62, while still providing the required strength against tearing in embodiments where the CM objects to overcome the motor's torque by a tensile force. The selection of the CM thickness d, width w and length l may also be made accounting for the effects of wind, e.g. to minimize its effect on the CM descent. By way of example, the CM thickness d may be in the range from about 0.1 mm to 1 mm, or up to 5 mm or more in some embodiments, but may also be outside of this range, depending on material. The CM thickness d may also be non-uniform along the length and/or width dimension, e.g. a CM object may be thicker at one or both ends along its length, thereby distributing weight properties to ensure a desired flight orientation in freefall, e.g. either "upright" or "horizontal". Other embodiments in which one or both ends of a CM object is either heavier or lighter than its middle may also be envisioned. In some embodiments the CM objects may be comprised of a plurality of materials to provide desired variation in density and/or other relevant property along its length, such as for example elasticity, density, weight, etc.

Referring back to FIGS. 3A and 3B, in some embodiments the CM objects 71 may be configured to get ensnared in the protective cage 67 of the target UAV, and be of the size sufficient to block the airflow 65 to the propellers, thereby disrupting the lift or thrust characteristic thereof and causing the target UAV to land. In such embodiments the CM objects 71 may be designed to have the surface area A that exceeds the area of an open cell 68 of the protective cage 67 or similar inlet, and preferably exceeds the area of two or more of the open cells of the protective cage 67 or similar inlet, so as to reduce the likelihood of being sucked in through an open cell or inlet. Such CM objects may be of a substantially 2D geometry width the width w of the same order of magnitude as the length l, as illustrated in FIG. 4E. The surface area A of one CM object in such embodiments may be at least 20% of an air intake area of an UAV propeller, or about 50% of the air intake area or greater, or may exceed the air intake area of one UAV propeller. By way of example, a UAV may be designed to hover at 50% of motor power, so blocking of more than 50% of the air intake of the propeller may cause the UAV to descend. In a sufficiently dense cloud of CM pieces with a surface area less than 50% of the propeller air intake area, two or more CM pieces may be necessary to down the UAV. By way of example, for a UAV with a propeller radius of 12 cm, the air intake area is about 450 cm$^2$, and a CM object of about 22×22 cm would substantially stop the airflow for that propeller set. CM objects in the form of a round, square, or somewhat irregular piece of a flexible film with a surface area of about 50 cm$^2$ to 100 cm$^2$ or more may be effective when the density of the CM cloud is sufficiently high so that more than one CM piece is likely to get caught in the protective cage of the UAV. CM objects of the surface area about 250 cm$^2$ or more may be effective for a less dense CM cloud. CM objects of smaller surface area could also be effective as a disruption of even 25% of the propeller airflow could be sufficient to disable the normal functioning of the UAV.

The CM objects 71 may be made of natural materials, synthetic materials, or combinations thereof. Latex, nylon, and various plastics such as polyethylene are examples of suitable synthetic materials. A thermoplastic starch (TPS) is another possible material choice that provides for an environmentally-friendly broadcast countermeasure. Furthermore TPS formulations exist that exhibit desired stress characteristic Sc for ensnaring and slowing down the propellers of modern small UAVs. In embodiments where CM objects are to be ensnared by the UAV propellers, CM materials may be selected that exhibit suitably high friction with the material of the propeller and body of the target UAV, which may be typically constructed from carbon fiber and high density plastic. In some embodiments some or all of the CM objects 71 may be of irregular shape, and may contain features, e.g. cutouts or extensions at its edges, to improve catchment by the leading edge of a propeller 62. CM objects of varied geometries may be combined to enable capture of various types of UAVs under a plurality of conditions with a single CM dispersion charge. By way of non-limiting example, a CM object in at least some embodiments may have one or more of the following properties or characteristics: length l between 0.5r to 5r, where r is the length of a blade of the UAV propeller, or typically in the range from 10 cm to 30 cm or longer, be capable of elongating elastically in the range from 10% to 800%, be capable of withstanding elongation loads from 0.4 N to 10 N, have tear resistance in the range from 0.1 N/m to 1 N/m, CM coefficient of drag Cd in the range from 0.075 to 0.15, or up to 0.75, terminal descent velocity at most 10 m/sec, or preferably about 1 m/s or less at normal atmospheric pressure. It will be appreciated that these ranges and values depend on an implementation and are by way of example only, so that CM objects characterized by parameter values outside of the corresponding ranges may be effective in some embodiments. In some embodiments, for example when designed for blocking the airflow to propellers, a CM object may be in the form of a piece of a thin film or sheet of light flexible material, which may be either elastic or inelastic, such as for example paper or cloth of suitable size.

In various embodiments a plurality of CM objects 71 may be dropped from an interceptor UAV, fired from an interceptor UAV using an explosive charge or another ejection system, and may also be fired from the ground using a directional launcher, as hereinafter discussed with reference to FIG. 5. In some embodiments the CM objects 71 may be broadcast or dispersed over an area as discrete separate objects that are not connected to each other. In other embodiments they may be tethered to a descent-arresting device, such as a parachute or a boom 735 as illustrated in FIG. 4F. Unlike a net, the CM objects can be connected in a 3-dimensional cluster of varying density and drag properties to form a "cloud" rather than a net, thereby giving rise to various countermeasure volumetric shapes. This enables a greater probability of capture and enable using less accurate and thus less expensive tracking and aiming systems. For example, CM objects with a relatively high weight, low drag can be attached together to form a lower ring, such as schematically illustrated in FIG. 4G, whereas lighter CM objects exhibiting greater drag may be attached together group-wise to form successively higher rings. In some embodiments the rings themselves may be interconnected to provide a spherical or semi-spherical CM cloud once deployed. Furthermore, individual CM objects 71 may be placed along axial tethers 147 (FIG. 4G) at decreasing separation away from a center to provide a uniform density ring and cloud.

In some embodiments the countermeasure material may be dispersed in the air so as to ensure the CM cloud is formed with a desired CM density $D_{CM}$ of and/or the desired CM cloud volume $V_{CMC}$ at a target location in the projected path of the target UAV. The CM cloud density $D_{CM}$ may be defined as the number of CM objects per unit of volume. The CM cloud volume is the volume of a 3D region which bounds the dispersed countermeasure cloud at a given point in time. We denote the number of CM objects that are to be ensnared by the UAV's propeller or propellers to disable the UAV as k, with k≥1, and a CM ensnarement volume associated with a single CM object as $V_{CM}$. The CM ensnarement volume $V_{CM}$ for a CM object of length l can be estimated as $V_{CM} \sim S_{prop} \cdot l$, where $S_{prop}$ is the surface area covered by a rotating UAV propeller, $S_{prop} \sim \pi r^2$. A CM cloud with a CM density $D_{CM} \sim k/V_{CM}$ will likely be effective against a UAV entering the CM cloud. In many commercial UAVs an overload of a single motor will lead to a shutdown of all motors or otherwise disrupt the ability to continue flight. Furthermore, in embodiments wherein the CM objects are tethered, ensnaring a CM object by one of the UAV propellers may automatically draw tethered CM objects into the surrounding propellers. Thus, a CM cloud with a CM cloud density of $D_{CM} \equiv (N \cdot V_{CM})^{-1}$ or greater, where N is the number of UAV propellers, may be effective in intercepting many commercial UAVs on the market. By way of example, a quadcopter UAV with the propeller length 12 cm may be effectively intercepted by a CM cloud having about eighteen 30-cm long CM objects in a cubic meter, or about 5-6 or more CM objects in a square meter in the plane of the UAV's propellers. The CM cloud density can be increased to disable UAVs with higher propeller counts that may be designed to handle a number of motor failures. The total number of CM objects in the CM cloud may be, for example, in the range from 10 to 50, or in some embodiments from as few as 5 to as many as 100 or more, depending on the type of CM objects used and the class of the target UAV.

Figure 5:
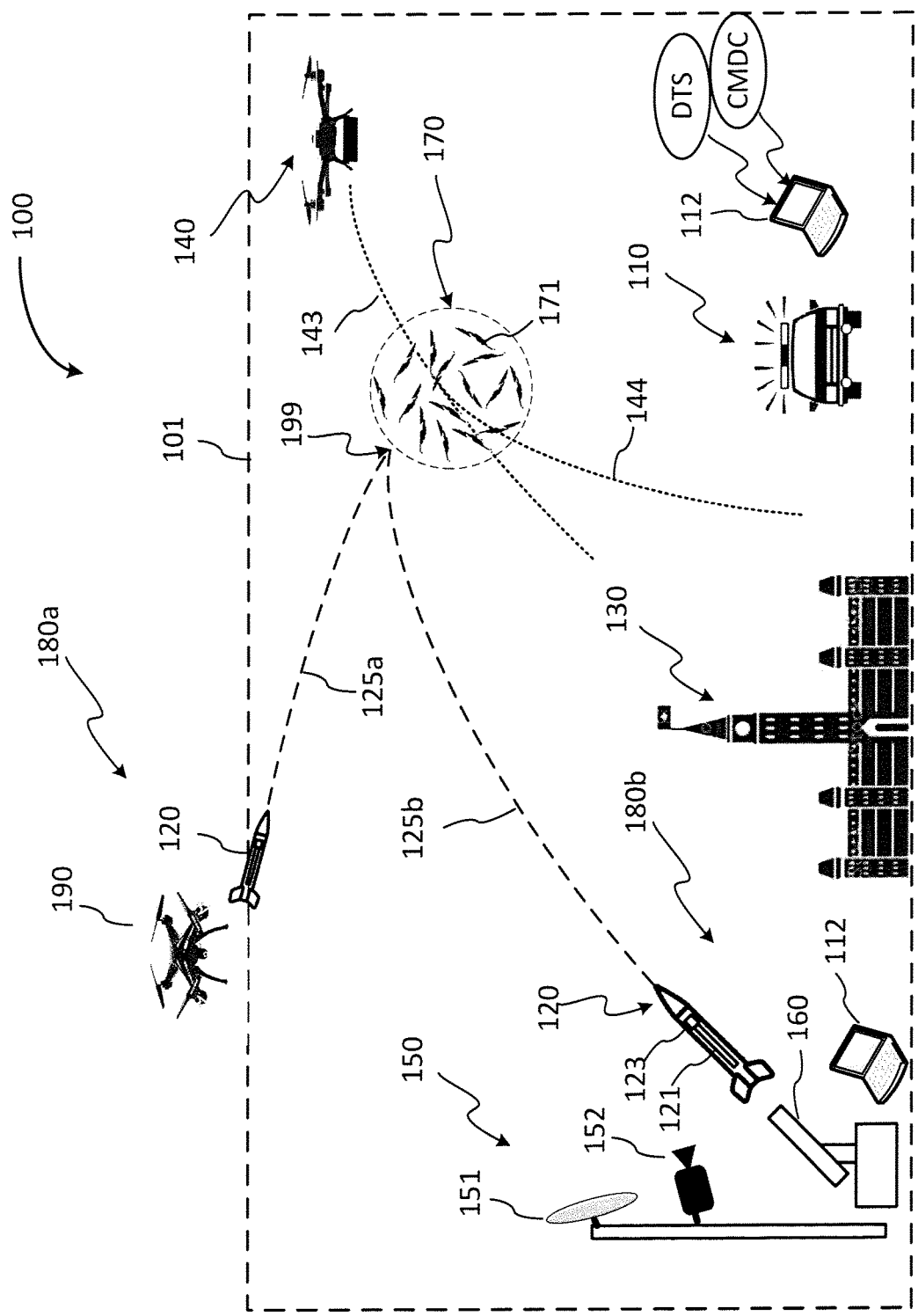
FIG. 5 is schematic diagram illustrating an example deployment of a UAV interception system.

Turning to FIG. 5, example implementations of an UAV interception system in a representative operating environment are schematically illustrated. An environment in which such a system may be implemented typically includes an interested party 130, such as an object or territory that requires protection from unauthorized UAVs, and a surveillance airspace or zone 101 around it. A UAV interception system may include a UAV detection system 150, which monitors the surveillance airspace 101 using one or more sensors to detect the presence of offending, e.g. unauthorized, UAVs, which are represented in the figure by a target UAV 140. In the illustrated example the one or more sensors that may be used by such a system are represented by a first sensor 151, such as a radar or a sonar for example, and a second sensor 152, such as a video camera for example. It will be appreciated that a plurality of suitable sensors may be provided, including but not limited to a plurality of video cameras and/or a plurality of radars and/or sonars and/or acoustic sensors disposed to enable suitable level of coverage of the surveillance zone 101. In some embodiments some or all of the sensors may be installed on a surveillance or interceptor UAV, which is represented in the figure at 190, on an authorized agent vehicle 110, and/or one or more buildings or ground-based platforms. The UAV interception system may further include a countermeasure (CM) deployment system 180a and/or 180b that may include a CM delivery projectile 120 and a projectile launcher 160. In one embodiment the CM deployment system may be in the form, or include, the interceptor UAV 190 that may carry one or more CM delivery projectiles 120 and the corresponding projectile launcher or launchers 160. In one embodiment the CM deployment system may be ground-based, as the CM deployment system 180b illustrated in the lower left corner of FIG. 4. The CM delivery projectile 120, which hereinafter may be referred to simply as projectile 120, may include a CM dispersing system 123 comprising a plurality of CM objects 171, and a suitable CM ejection system 121, which may also be referred to herein as CM ejector 121. The CM delivery projectile 120 may also contain a CM dispersion means or device for dispersing the CM objects 171 in the air at a target location, so as to form a CM cloud 170 in a projected path 143 of the target UAV 140 at a projected time of engagement. In one embodiment, the CM dispersing system 123 may be in the form of a suitable container, such as a canister 70 illustrated in FIG. 6, that contains a plurality of CM objects 71 that can be forcefully released in the air at a target location, for example using a suitable dispersing charge. In one embodiment the container may be pressurized. In some embodiments the CM ejection mechanism may be configured to operate in two or more modes, with the size and the density of the resulting CM cloud depending on the mode of the CM ejection and/or dispersion. For example it may be configured to either fire a selectably charged (i.e. 0% charge to 100% charge) container with the CM objects therein to be dispersed in a target location to form a CM cloud, or to simply drop a plurality of CM objects into the air. In one embodiment the CM ejector may be configured to eject the container in response to a CM ejection command. Other non-limiting examples of the CM dispersing system and the CM ejection system include a CM cannon, a CM-containing projectile, a guided delivery vehicle carrying the CM objects, and the like. In the context of this specification the term 'projectile' will be used to encompass self-guided or externally-guided missiles.

The UAV interception system may further include a computer system or systems 112, which in some embodiments may implement a UAV interception control system (ICS) that may include a UAV detection and tracking subsystem (DTS) and a countermeasure deployment control subsystem (CMDCS), as will be described hereinbelow in further details with reference to example embodiments. The computer system 112 may include a UAV communication module configured to wirelessly communicate commands to the interceptor UAV 190 and/or a control system on-board of the projectile 120 when provided, including in some embodiments a command to deploy a CM, and/or to communicate with the target UAV 140.

Figure 7:
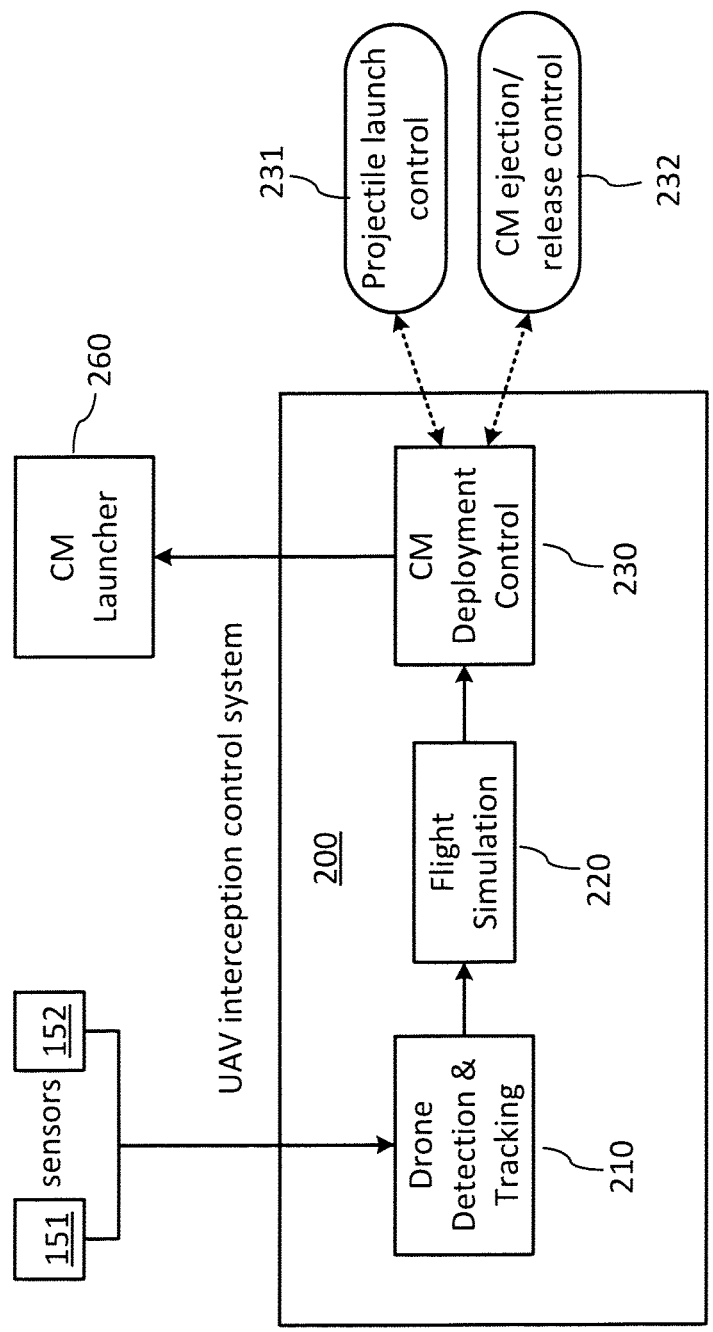
FIG. 7 is a schematic functional block diagram of a UAV detection and tracking computer system in association with a countermeasure deployment system.

With reference to FIG. 7, there is illustrated a functional block diagram of an example UAV ICS 200 which may be implement by the computer system 112 of FIG. 5. In the embodiment illustrated in FIG. 7 ICS 200 includes a UAV detection and tracking system (DTS) 210, a flight simulation system (FSS) 220, and a CM deployment control system (CMDCS) 230. DTS 210 may be configured to communicate with the one or more UAV detection sensors 151, 152 and to track movements of the target UAV over a period of time based on UAV location and movement data received from the sensors. FSS 220 may be configured to determine a projected interception location, and CMDCS 230 may be configured to generate a CM deployment command for communicating to the projectile launch system. In some embodiments CMDCS 230 may implement a projectile launch control function or module 231 and a CM ejection/release function or module 232. In operation DTS 210 may collect information from sensors 151 and 152 and, based on that information, detect whether an offending UAV 140 is present in the surveillance airspace. If such UAV is detected, DTS 210 may pass UAV location and movement data to FSS 220. DTS module 210 may track movements of the detected UAV in space based on sensor data, and continuously or periodically provide updated UAV location and movement data to FSS 220. In some embodiments DTS 210 may also compute instantaneous and/or averaged speed and/or acceleration of the target UAV 140 using the UAV location data received from the sensors, or it may receive speed and/or acceleration data directly from the sensors.

Continuing to refer to FIG. 7 while also referring to FIG. 5, FSS 220 may be configured to compute, and periodically update, a projected path 143 of the UAV 140 based at least in part on the latest UAV location and movement data. In some embodiments FSS 220 may compute instantaneous velocity and/or acceleration of the target UAV based on the UAV location data received from DTS 210. FSS 220 may also compute, and periodically update, a time to target value t2t, which represents the time required for a countermeasure to be deployed and to engage the target UAV 140 after a command to fire or to deploy the CM is issued. In embodiments wherein a cloud 170 of CM objects 171 is deployed to intercept the target, the time to target t2t may correspond to the time required for the CM cloud 170 to engage the target UAV 140. The t2t values may account for one or more of the following: the time needed to launch the projectile 120, time of flight of the projectile 120 to a target CM release location, and the time for the CM cloud to descend into the projected path 143 of the offending UAV 140.

In at least some embodiments FSS 220 may also compute, and periodically update, a location probability volume Sp(t) for the offending UAV 140 at one or more future time instances t. The location probability volume Sp(t) defines a range of probable UAV locations at a projected time instance t. In some embodiments the range of probable UAV locations defining the location probability volume Sp(t) corresponds to a range of possible or probable values of one or more control inputs to the offending UAV in flight. In some embodiments FSS 220 may use the location probability volume Sp(t) computed for a projected interception time instance $t=(t_0+t2t)$, where $t_0$ is a current time instance, to determine if a firing criterion is satisfied, prior to generating a CM deployment command. The projected interception time instance, i.e. the time at which the target UAV is projected to be engaged by a CM, may also be referred to herein as the projected hit time. In some embodiments FSS 220 or CMDCS 230 may compare the location probability volume Sp(t) for a projected interception time instance to a pre-defined CM cloud volume $V_{CMC}$ and, if they match in size to a desired degree, FSS 220 may pass related information to CMDCS 230. Once the computed location probability volume Sp(t) for the projected interception time t satisfies the firing criterion, CMDCS 230 may generate a command, or a set of commands, to a CM launcher 260 to launch a CM delivery projectile 120 to a target location where the CM objects 171 are to be released, or a command to release the CM objects 171 from the CM delivery projectile 120.

The volume $V_{CMC}$ of the CM cloud 70, which may also be referred to herein as the capture volume or the CM volume, may depend on the CM dispersion kinetics, the size of the CM objects, their packaging, surface area, weight, dispersion charge, launch tube diameter, number of CM objects per charge, etc. It may be estimated or experimentally determined in advance for one or more different CM ejection mechanisms or modes, and saved in memory of ICS 200. By way of example, 5 g of FFFG-type propellant in a 4" diameter launch tube with 50 pieces of 2"×12" chaff, resident for $t_p$=4 seconds in a target zone yields about 400 cubic feet, or about 11 cubic meters, of "capture" volume. Here $t_p$ may be understood as the time that one CM object takes to fall through the location probability volume Sp(t) of the target UAV.

Figure 8:
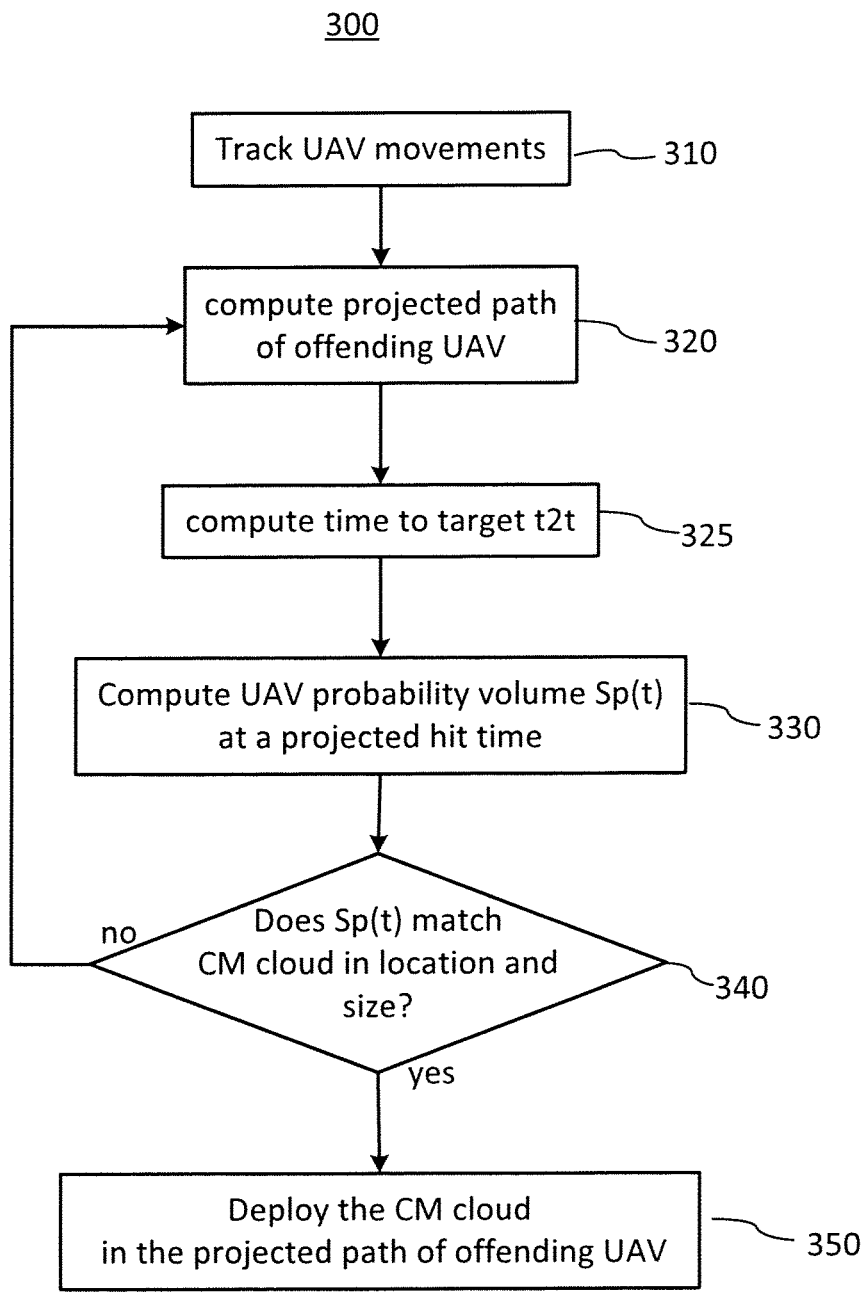
FIG. 8 is a flowchart of an example process of UAV interception that may be implemented by the system of FIG. 7.

Turning to FIG. 8, there is shown a flowchart of an example process 300 which ICS 200 may implement for intercepting the offending UAV 140, and elements of which were described hereinabove with reference to FIG. 7. As illustrated, process 300 includes tracking movements of the offending UAV at step or operation 310, computing a projected path of the offending UAV based on the UAV tracking data at step or operation 320, computing the time to target t2t at step or operation 325, and computing the UAV location probability volume Sp(t) at a projected hit time at step or operation 330. Step or operation 340 checks whether the probability volume Sp(t) at a time instance $t \geq (t_0+t2t)$ matches in size a projected CM cloud volume $V_{CMC}$ or its volumetric density function Sd to a desired degree, or satisfies another pre-defined firing criteria based at least in part on the computed Sp(t). If the firing criterion or criteria is/are not satisfied, steps or operations 320, 325, 330 are repeated. If the firing criterion or criteria is/are satisfied, at step or operation 350 a CM deployment command or a projectile launch command is generated for deploying the CM to a target location along the projected path of the UAV.

Operations 310-340 may be performed repeatedly at a selected update frequency until the target UAV is intercepted or an interception command is generated. By way of example, ICS 200 of FIG. 7 may operate with an update frequency of 10 Hz, so that every 0.1 sec DTS 210 reads, from sensors 151, 152, latest UAV location and movement data and provides them to the flight processing module 220, which updates the projected path of the UAV also every 0.1 sec. The probability volume Sp(t) for various locations along the projected UAV path may also be updated at the same rate or optionally at a slower rate. It will be appreciated that update frequencies other than 10 Hz may be used, and that an update periodicity is not a requirement.

Figure 9:
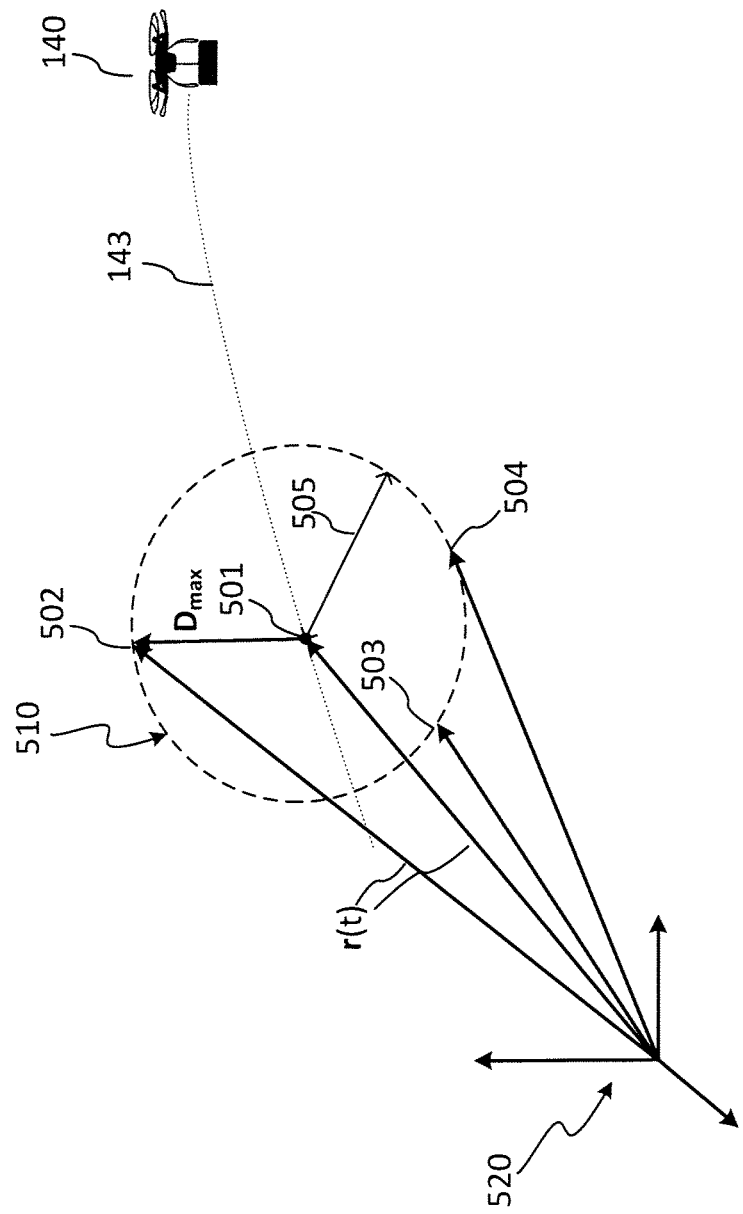
FIG. 9 is a schematic diagram illustrating a location probability volume of a target UAV at a projected time instance.

Turning now to FIG. 9, there is schematically illustrated a location probability volume Sp(t) 510 at a projected time instance t for a target UAV 140. In some embodiments the location probability volume Sp(t) 510 encompasses a plurality of possible locations of the target UAV 140 at the projected time instance t, as illustrated at 501-504 in the figure, for a range of values of possible control inputs to the target UAV 104. The relevant range of possible values of the control parameter of parameters relate to UAV fight control parameters that may potentially be provided thereto by the operator of the target UAV 140, or its internal flight program between a current time instance $t_0$, which may be the latest time instance for which measured UAV locations are available from the sensors, and the projected time instance t. Future locations of a target UAV on a span of a few seconds to a minute may be considerably more difficult to predict than that of a conventional manned aircraft or a ballistic missile because of the high maneuverability of a typical small UAV and the difficulty of predicting its control inputs, which may typically come from a person or system controlling the offending UAV, and about which there is typically little or no information. Accordingly some embodiments of ICS 200, or variants thereof, may compute the UAV location probability volume Sp(t) 510 along the projected path 143 of UAV 140 accounting for a range of possible values of one or more of control inputs that may affect future movements of the detected UAV 140. This may include computing a plurality of UAV location vectors r(t) defining a plurality of possible UAV locations 501-504 corresponding to different UAV control input variations from the time of the last UAV location measurement to the projected time instance t. The range of control inputs possible for a specific UAV may depend on its class, type, or model. A coordinate system 520 in which the projected path 143 and the location probability sphere 510 for the target UAV is computed may be associated, for example, with the location of the projectile 120, or its launcher 160, or the computer system implementing ICS 200.

Figure 6:
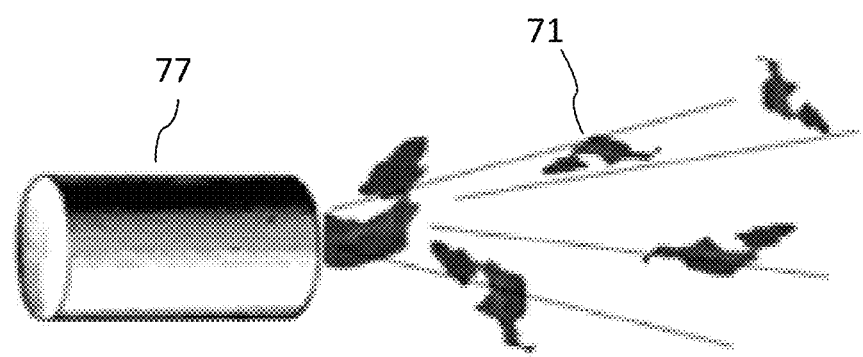
FIG. 6 is a schematic diagram illustrating countermeasure deployment by ejecting from a charged container.
Figure 10:
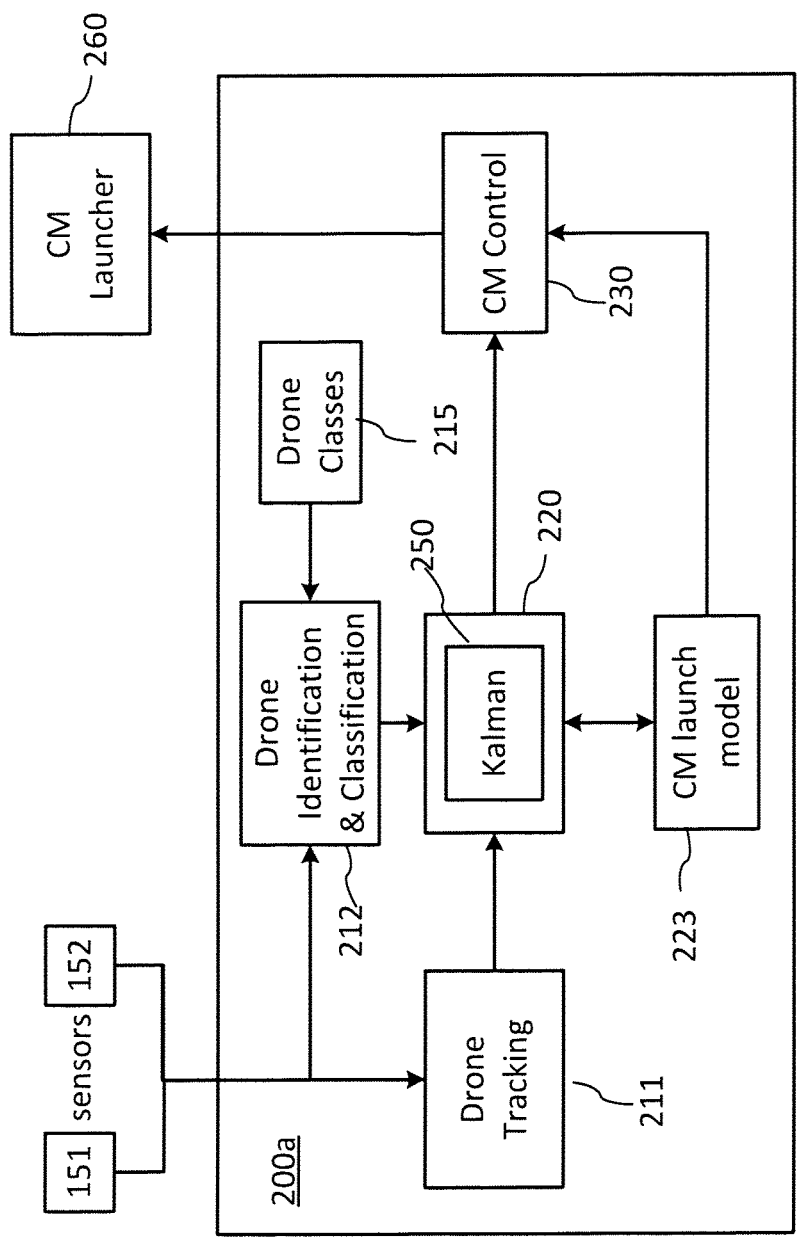
FIG. 10 is a schematic functional block diagram of an embodiment of the UAV detection and tracking computer system of FIG. 6 using UAV identification and classification.
Figure 11:
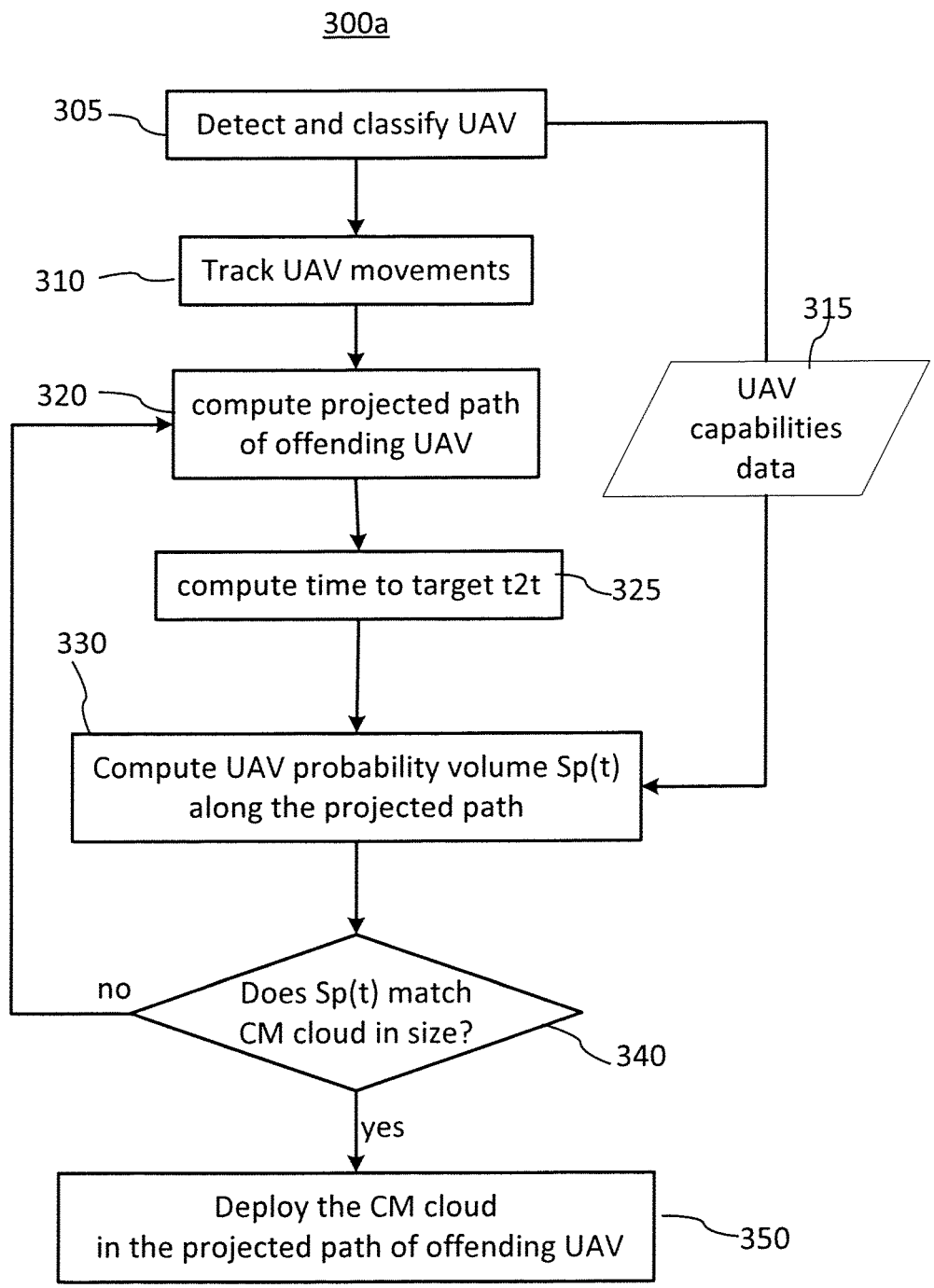
FIG. 11 is a flowchart of an example process of UAV interception that may be implemented by the system of FIG. 10.

Turning now to FIGS. 10 and 11, they illustrate a functional block diagram of a variant of ICS 200 of FIG. 7 and a flowchart of one embodiment of a process for intercepting a target UAV it may implement. The ICS variant shown in FIG. 10, which is indicated generally as ICS 200a, includes DTS 210 and FSS 220, which may operate generally as described hereinabove with reference to FIGS. 7 and 8. Furthermore DTS 210 of FIG. 6 is embodied in ICS 200a with a UAV tracking module 211 and a UAV identification and classification module 212. The UAV tracking module 211 implements the UAV tracking functionality of DDT 210, i.e. it is configured to monitor and record locations of the offending UAV as it moves in the surveillance airspace based on sensor signals from sensors 151, 152. The UAV tracking module 211 may also compute instantaneous speed and/or acceleration of the offending UAV using the UAV location data from the sensors, or receive speed and/or acceleration data directly from the sensors.

The UAV identification and classification module 212 implements UAV identification and classification functions, which may include using data collected from sensors 151 and 152, and optionally from the UAV tracking module 211, to classify the offending UAV into one of a plurality of pre-defined UAV classes or types in order to determine its capabilities. Accordingly, ICS 200a may include, or be operatively coupled to, memory 215 storing relevant identification data and characteristics of a plurality of UAV types or classes and their respective capabilities. The capabilities of interest may include UAV maneuverability data that are relevant for computing the projected path of the UAV and its uncertainty, including one or more of such UAV characteristics as minimum and maximum horizontal speed $v_{min}$ and $v_{max}$, maximum climb and descent rates, maximum acceleration $a_{max}$, the number of propellers, and maximum motor torque $T_{max}$. They may also include UAV characteristics that are relevant to evaluating the threat level, such as payload capacity and equipment options. The UAV identification and classification module 212 may be configured to use a suitable combination of acoustic, radar, radio-frequency, thermal, sonar, image, video and other data from the sensors 151, 152 to obtain UAV identification data and characteristics that may be relevant to identifying its type or class, such as, but not exclusively, UAV size, the number, relative size, and configuration of UAV propellers, any visible markings, registration information, electronic (radio frequency) signature information, acoustic signature information, payload configuration, and other information. In some embodiments the UAV identification and classification module 212 may further be configured to use a learning algorithm to classify the offending UAV based on the collected sensor data. The UAV identification and classification module 212 may further be configured to compare the UAV identification data it collects to those stored in memory 215 to identify the class or type of the detected UAV. Corresponding UAV maneuverability data may then be passed to FSS 220 for use in determining the projected path of the target UAV and/or the location probability volume Sp(t) for one or more future time instances.

Referring to FIG. 11, there is illustrated a variation 300a of process 300 of FIG. 8 that ICS 200a may implement, which includes the use of UAV classification and corresponding UAV capabilities data 315 for computing the projected path of the UAV and/or the probability volume thereof. Similarly to process 300, process 300a includes step or operation 310 of tracking movements of the offending UAV, step or operation 320 of computing projected path of the offending UAV based at least in part on the UAV tracking data at step or operation 320, step or operation 325 of determining the time to target t2t, and 330 of computing UAV location probability volume Sp(t) at one or more projected time instances, step or operation 340 of checking whether the location probability volume Sp(t) at a time instance t≥(t$_0$+t2t) matches in size a projected CM cloud volume V$_{CMC}$ to a desired degree, and step or operation 350 of generating a command to deploy the CM to a target location.

Additionally, process 300a includes the step or operation 305 of detecting and classifying the offending UAV, such as for example described hereinabove with reference to blocks 212, 215 of ICS 200a of FIG. 8. The UAV capabilities data 315 generated by the UAV identification operation 305 are then used at step or operation 330 to compute the UAV location probability volume Sp(t) along the projected path of the UAV.

Referring back to FIG. 10 and FIG. 5, in embodiments wherein the CM ejector 121 or another mechanism of the delivery projectile 120 is capable of implementing different CM ejection techniques or modes resulting in different CM cloud configuration and/or kinetics, ICS 200a may further include a CM launch model block 223 which specifies respective CM kinetics models that may be used by the FSS 220 when estimating the dispersion and movement of the CM objects. The different ejection modes may result in different kinetics of the CM cloud, thereby affecting projected time to target values t2t, and in differing CM dispersion characteristics, resulting in differing sizes and density of the CM cloud. FSS 220 or CMDCS 230 may be configured to select one of the supported CM ejection techniques that maximizes the probability of UAV interception in dependence on its projected flight trajectory and/or identified capabilities, class, or size. Example CM ejection modes that may be implemented include, but are not limited to, using a solid-fuel ejection charge, a multi-stage ejection charge containing a dynamic charge quantity, a pressurized gas ejection charge, a mechanical spring release, or releasing the CM objects in the air without an ejection charge.

Parameters defining the range of control inputs used in computing Sp(t) at 330 may include those defined by the UAV capability data 315, such as the minimum and maximum horizontal speed $v_{min}$ and $v_{max}$, maximum climb and descent rates, maximum acceleration $a_{max}$, the number of propellers, and maximum torque $T_{max}$. Thus in some embodiments computing the probability volume Sp(t) in step 330 includes computing predicted UAV locations, exemplified at 501-504 in FIG. 9, at one of the projected time instances t for a range of control inputs to the UAV. The range of control inputs used in the computation may be defined by the UAV capabilities data 315 as identified for the offending UAV. In situations where the UAV identification was unsuccessful, or in embodiments wherein a UAV classification module is not implemented, a default range of relevant control parameters may be used.

In one embodiment the FSS 220 may implement a modified recursive Kalman filter 250 to compute the projected path of the UAV and the location probability volume Sp(t). The following is a brief mathematical description of one "measure—predict—update" cycle of an example implementation of a Kalman filter in accordance with an embodiment of the present disclosure; variations of the algorithm will be evident to those skilled in the art and are within the scope of the present disclosure. The following notations are used hereinbelow: x and/or X are matrices that describe a state of an object which position is being tracked to predict its trajectory, such as the offending UAV, at a particular time instance; $x_k$ and/or $X_k$ denoting the UAV state at a time instance $t_k$, where k denotes the index of the update and may also be referred to as the iteration or cycle index of the recursive Kalman update algorithm; A is a linear prediction matrix that may be derived from a kinematic model of the UAV movement as known in the art; u is a control input matrix or vector which elements correspond to various control inputs for the target UAV, and B is a corresponding control response matrix that may be derived from a kinematic model of UAV motion for a particular set of control inputs; P and/or p denote the covariance matrices for the UAV state x or X, with $P_k$ and/or $p_k$ denoting the covariance matrix at k-th update cycle; diagonal elements of the covariance matrices define the variance, or predicted uncertainty, of each element of the state matrix X or x; Q is an error source matrix.

A prediction phase of a k-th iteration of the Kalman cycle may be described by the following equations:

$$X = A x_{k-1} + B_{k-1} u_{k-1} \quad (8)$$

$$p = A P_{k-1} A^T + Q \quad (9)$$

At this phase, a prediction X of a UAV state is computed based on a dynamic model of UAV's motion and the UAV state obtained at the previous (k−1)th iteration.

Next, an update to the prediction X is made based on the latest UAV movements data obtained by the sensors at time $t_k$:

$$x_k = X + K(z - HX) \quad (10)$$

where z is the UAV state as last measured by the sensors, H is sensor matrix defining a mapping between sensor signals and UAV state, and K is a Kalman gain that satisfies the equation $$K = p H^T (H P_k H^T + R)^{-1} \quad (11)$$

where R is the covariance of the sensor noise which takes into account measurement uncertainties. For example the sensor noise matrix R may account for the presence of wind noise if an acoustic sensor is used. The UAV state covariance is updated as $$P_k = p - KHp \quad (12)$$

Equations (8)-(12), or their variations or equivalents, can be used to compute a projected UAV state and its uncertainty for one or more future time instances t given sensor data and the UAV state/uncertainty estimated at a previous update cycle. The computations can be repeated each time new UAV movements data are received from the sensors to update the projected path of the offending UAV. By way of example, a UAV tracking module may read sensor data related to the current location of the offending UAV, and perform the updates defined by equations (8)-(12), every 0.1 second.

In an example embodiment the state matrices X and x may be composed of elements of a position vector $r=[r_x, r_y, r_z]$, a velocity vector $v=[v_x, v_y, v_z]$, and an acceleration vector $a=[a_x, a_y, a_z]$, for example as $$x_k = \begin{bmatrix} r \\ v \\ z \end{bmatrix} = \begin{bmatrix} r_x & r_y & r_z \\ v_x & v_y & v_z \\ a_x & a_y & a_z \end{bmatrix} \quad (13)$$

With this representation of a UAV state, the prediction matrix A may be in the form $$A = \begin{bmatrix} 1 & dt & 1/2(dt)^2 \\ 0 & 1 & dt \\ 0 & 0 & 1 \end{bmatrix} \quad (14)$$

where $dt=(t_k-t_{k-1})$ is the time increment between update cycles, or 0.1 sec by way of example. By using the updated weighted average motion equations, future states can be predicted from the present state. At each measurement data update, the projected path of the UAV for future time instances $t_k, t_{k+1}, t_{k+2}, \ldots$, may be computed by iteratively propagating equations (8) and (9) for a default set of control parameters.

It will be appreciated that in other embodiments a state matrix or vector X or x of the offending UAV may include fewer than 9 elements. For example some embodiments of the modified Kalman filter 250 of the present disclosure may operate on state vectors or matrices that are defined only by the position vector r and the velocity vector v. Some embodiments of the Kalman filter 250 of the present disclosure may operate on state vectors or matrices of rank 3 that are defined by the position vector r.

Conventional implementations of Kalman filtering assume that the control inputs defined by elements u(i) of the control input matrix u are known; however that may not be the case for a typical UAV due to its high degree of maneuverability and generally unpredictable behavior of a system or person controlling it. Accordingly, embodiments of the ICS 200 or 200a of the present disclosure may utilize a modified Kalman filter process in which one Kalman update cycle may include computing a plurality of projected future states r(t) for a range of possible values of one or more control inputs in u, giving rise to the probability volume Sp(t) that encompasses or approximates a plurality of projected UAV locations r(t) for a future time instance t. By way of example, if the offending UAV 140 that is flying at a constant speed suddenly reverses direction, the modified Kalman filter 250 of the present disclosure accounts for that through the use of a control parameter range or ranges $[u(i)_{min}, u(i)_{max}]$ in Kalman filter updates, where u(i) denotes an element or elements of u that defines the direction of the UAV movement, so that the computed location probability volume includes the new position of the UAV.

This approach may be particularly useful when the measurement accuracy of the system is low or the measurements are relatively infrequent. Since a UAV is highly maneuverable, using a standard Kalman filter would require very precise measurement inputs at high sampling rates, requiring impractical measuring methods or high system costs. The approach disclosed herein may compute a probability distribution for the location of the offending UAV at a time of a projected hit, and then makes a firing decision based at least in part on the computed probability distribution. This probability distribution, which may take the form of the location probability volume Sp(t) 510 but in other embodiments may also account for a non-uniform distribution of probability within Sp(t), is not defined by "noise" but rather by a range of possible control inputs to the offending UAV that may have changed after the last update. This gives rise to a more realistic depiction of the possible states of a UAV at any given time, and a more accurate and reliable interception.

The control inputs matrix u and the corresponding control response matrix B may be selected in a variety of ways. In one embodiment control inputs may be defined as changes rm, vm, am in the UAV position vector, velocity vector, and acceleration vector, respectively, over one time update step, from $t_{k-1}$ to $t_k$. The control input matrix u may be then defined as $$u = \begin{bmatrix} rm \\ vm \\ am \end{bmatrix} \quad (15)$$

with the velocity change vector vm=[$vm_x$, $vm_y$, $vm_z$], the position change vector rm=[$rm_x$, $rm_y$, $rm_z$], and the acceleration change vector am=[$am_x$, $am_y$, $am_z$] over a time update increment may vary within ranges defined by the UAV classification data. In this embodiment the control response matrix B, which is defined by the kinematic model of the UAV motion, may be substantially the same as the system update matrix A:

$$B = \begin{bmatrix} 1 & dt & \frac{1}{2dt^2} \\ 0 & 1 & dt \\ 0 & 0 & 1 \end{bmatrix} \quad (16)$$

In one embodiment update-interval changes in the UAV location and acceleration may be excluded from the control parameters, i.e. vectors rm and am may be set to zero, and the velocity change vector vm=[$vm_x$, $vm_y$, $vm_z$] chosen to represent the set of control parameters. In this embodiment, the control term in Kalman update equation (8) may be in the form $$Bu = \begin{bmatrix} 1 & dt & \frac{1}{2}dt^2 \\ 0 & 1 & dt \\ 0 & 0 & 1 \end{bmatrix} \begin{bmatrix} 0 & 0 & 0 \\ vm_x & vm_y & vm_z \\ 0 & 0 & 0 \end{bmatrix} = \begin{bmatrix} vm_x dt & vm_y dt & vm_z dt \\ vm_x & vm_y & vm_z \\ 0 & 0 & 0 \end{bmatrix} \quad (17)$$

Here $vm_z$ represents a change to the climb/decent rate of the UAV over an update interval, which may vary within a range [$-v_{d\ max}$, $v_{c\ max}$] that may be defined for each UAV type. Control parameters $vm_x$, $vm_y$ define possible changes in the UAV' horizontal speed $v_h$ (forward/reverse) over the update time increment. If $v_h$ for a particular UAV type can vary in the range [$-v_{h\ max}$, $v_{h\ max}$], each of $vm_x$, $vm_y$ may also vary in this range, possibly depending on the configuration of the UAV, for example whether it is a quadcopter or a centreline thrust UAV.

Referring back to FIG. 9, the projected path 143 of UAV 140 may be determined, for example, by propagating the Kalman filter equations for a default set of control inputs. In one embodiment it may correspond to assuming no changes to the UAV velocity from a current time instance to the projected time instance t, i.e. $vm_x=vm_y=vm_z=0$, which may yield location 501. The location probability volume Sp(t) 510 may be computed by propagating the Kalman filter while varying the control parameters within their defined ranges to obtain other possible UAV locations 502-504 corresponding to one or more alternative selections of the control input parameters. In the simplified example embodiment described hereinabove with reference to equation (17), Sp(t) 510 may be computed by propagating the Kalman filter with one or more of the following settings:

a) $vm_z=-v_{d\ max}$, $vm_x=vm_y=0$; (max decent, no change horizontally)
b) $vm_z=+v_{c\ max}$, $vm_x=vm_y=0$; (max climb, no change horizontally)
c) $vm_x=+v_{h\ max}$, $vm_z=vm_y=0$; (max forward, no change vertically)
d) $vm_x=-v_{h\ max}$, $vm_z=vm_y=0$; (max reverse, no change vertically; may give the same UAV displacement as (c), so may not be needed)
e) $vm_y=+v_{h\ max}$, $vm_z=vm_x=0$; (max right, no change vertically; may give the same |displacement| as (c), so may not be needed)
f) $vm_y=-v_{h\ max}$, $vm_z=vm_x=0$; (max left, no change vertically; may give the same |displacement| as (c), so may not be needed)

In one embodiment, the location probability volume Sp(t) may be approximated with a sphere, and the maximum displacement computed for (a), (b), and (c) from the default projected location 501 may be selected as the radius 505 of the location probability sphere Sp(t) 510.

The example described hereinabove relates to one possible choice of control parameters for the target UAV that may be used to compute the projected path of the target UAV and the location probability volume Sp(t) for a projected engagement time; it will be appreciated that in other embodiments other sets of control parameters may be chosen, and then used to model possible UAV movements to compute its location probability volume for the time of projected CM engagement. Furthermore, different sets of control parameters may be used by ICS 200a for different UAV types. For example, in one embodiment different sets of control parameters may be used for n-copters, i.e. helicopter-type UAVs with n propellers, and fixed-wing UAVs, and their respective ranges saved in the ICS memory, as follows: for n-copters, climb/descend rate, pan angle left (L) and right (R), rotation angle L/R, and forward/reverse speed; for fixed-wing UAVs: pitch up/down, roll L/R, yaw L/R, and thrust/brake. The terms pan/roll, yaw/rotate, and pitch refer to various angles as commonly used in describing motions of an airborne vehicle, and their derivative effects on the UAV motion. Other combination of control parameters may also be chosen. One skilled in the art will be able to generate the control matrix u and the corresponding control response matrix B for each of these sets of control parameters, as described hereinabove by way of example.

Figure 12:
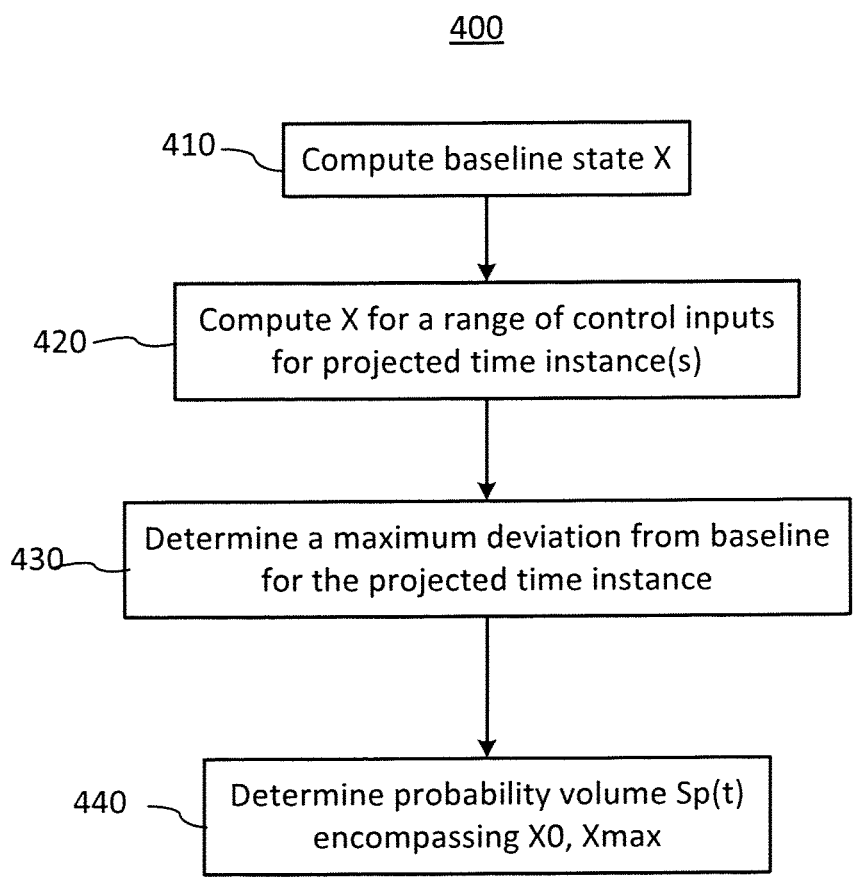
FIG. 12 is a flowchart illustrating one update cycle of a modified Kalman filter that may be utilized by the systems of FIGS. 7 and 10.

Turning to FIG. 12 while also referring back to FIG. 9 for illustration, in one embodiment FSS 220 may implement a simplified modified Kalman filter process 400 to predict a range of future locations of the offending UAV 140. Its operation in a k-th update cycle may include executing Kalman filter at step or operation 410 to compute a baseline state $X_0(t)$ 501 for the offending UAV at a future time instance t or a set {$t_i$} of future time instances $t_i$. The baseline state $X_0(t)$ 501 may correspond to a baseline set of control inputs to the UAV. The baseline control inputs may correspond for example to the absence of new control inputs that would lead to a change in UAV's trajectory or velocity. In one embodiment this step may include iteratively computing a plurality of baseline location vectors $r_0(t_i)$ for the set of future time instances $t_i$, which together may define the projected path 143 of the UAV.

In one embodiment an iterative calculation may be performed at step or operation 420 over a set of future times while varying each or at least some of the control inputs within their respective ranges, at each consecutive time instance t. In one embodiment the Kalman filter may be iteratively executed at 420 over the set of future time instances $\{t_i\}$ multiple times for a plurality of control inputs, each time varying each or at least some of the control inputs within their respective ranges so as to determine, for each future time instance $t_i$ from the set, a plurality of possible UAV locations $r(t_i)$. At step or operation 440, the location probability volume $Sp(t_i)$ for the UAV at the one or more projected time instances $t_i$ may be determined from the plurality of possible UAV locations $r(t_i)$. In some embodiments the computation of the location probability volume at a projected time instance at steps 420-440 may include applying Kalman filter updates in a nested iterative loop wherein a plurality of UAV control parameters are iterated within their respective ranges. For example, a 7 second prediction loop could calculate 7 maximum absolute state values, $X_{max}(t_i)$, $l=1, \ldots 7$ for each second after $t_0$. The maximum absolute values could define seven 3-dimensional shapes where each shape represents all possible positions of the offending UAV at a given time $t_i$.

In one embodiment a maximum deviation $D_{max}(t)=|r(t)-r_0(t)|$ of the UAV location vector $r(t)$ from the baseline location $r_0(t)$ 501 may be determined at step 430 for each or some of the time instances $t_i$, and then used in step 440 to determine a 3D sphere 510 in the location space exemplifying the location probability volume $Sp(t)$ where the target UAV 140 could be located at the corresponding time instance. In one embodiment operation 430 may compute maximum deviations from the baseline for all three location vector components $r_x$, $r_y$, $r_z$. The probability volume $Sp(t)$ may then be defined at step 440 as an ellipsoid, with the maximum deviations for $r_x$, $r_y$, $r_z$ defining the three ellipsoid axes. In some embodiment the location probability volume $Sp(t)$ 501 may be approximated by a sphere which radius may be determined as an average or a maximum of the maximum position deviations for $r_x$, $r_y$, $r_z$.

In some embodiments step 420 may also be executed for elements $X[i]$ of the state vector or matrix X that defines the velocity state of the UAV, i.e. its velocity vector $v=[v_x, v_y, v_z]$, i.e. for $X[i=4]=v_x$, $X[i=5]=v_y$, and $X[i=6]=v_z$. Step 430 may then include computing a probability volume $Sp_v(t)$ in the UAV velocity space $(v_x, v_y, v_z)$. In some embodiments step 420 may also be executed for elements $X[i]$ of the state vector or matrix X that defines UAV acceleration vector $a=[a_x, a_y, a_z]$, i.e. for $X[i=7]=a_x$, $X[i=8]=a_y$, and $X[i=9]=a_z$. Step 430 may then include computing a probability volume $Sp_a(t)$ in the UAV acceleration space $(a_x, a_y, a_z)$.

Step 410 may be performed, at each trajectory update step k, for a series $\{t_i\}$ of future time instances $t_i$, $i=1, \ldots i_{max}$, so as to determine the projected path $r_0(\{t_i\})$ 143 of the offending UAV 140. Simultaneously FSS 220 may simulate possible CM launch and/or deployment scenarios to determine a target hit location along the projected path $\Omega_0(\{t_i\})$ of the UAV, and the time to target t2t needed for the CM objects to be deployed at the target hit location in the projected path of the UAV 140. FSS 220 may then execute steps 420-440, or a variation thereof to compute the location probability volume $Sp(t)$ for a projected hit time $t_h=t_k+t2t$. FSS 220 and/or CMDCS 230 may further compare the location probability volume $Sp(t_h)$ computed for the projected hit time $t_h$ to the projected CM deployment volume Sd at the time of the projected hit, and generate a CM deployment command, for example a command to fire the CM projectile or to release the CM objects, if a pre-defined firing criterion is satisfied.

It will be appreciated that the further ahead in time the predictions related to the location of the offending UAV 140 are to be made, the less certain will be the system's projections of the UAV location. This, however, may be at least partially compensated by higher accuracy in the update cycle, the measurements of which can be sent to the CM launch and navigation system prior to and after a command to launch has been given. In simulating the CM launch and deployment scenarios, FSS 220 may model the trajectory of the CM projectile 120 after launch to determine one or more projected hit locations and one or more corresponding t2t values. In some embodiments FSS 220 may also utilize a Kalman filter, such as the modified Kalman filter 250 of the type described hereinabove, to estimate the respective trajectories of the CM projectile. In embodiments wherein the CM launcher 160 is mounted on an interceptor UAV 190, the movements of the interceptor UAV 190 may be taken into account when computing t2t values, projected hit locations, and possibly the CM projectile launch conditioning and/or the CM deployment methods. In some embodiments the modified Kalman filter 250 may be defined in terms of location coordinates and, possibly, velocity of the offending UAV 140 relative to that of the interceptor UAV. In some embodiments the state of the interceptor UAV at each update instance may also be obtained using a Kalman filter.

In one embodiment determining whether the firing criteria are satisfied includes computing a hit probability for the UAV at the projected hit location, and comparing the estimated hit probability with a pre-defined threshold. The hit probability $P_m$ may be estimated as a function of the volumetric overlap between the location probability volume $Sp(t)$ and the countermeasure deployment volume $V_{CMC}$. In some embodiments the hit probability $P_m$ may be computed accounting for the density of the CM deployment volume $V_{CMC}$. By way of example, in some embodiments the firing criteria may include checking if the projected density of the CM deployment volume exceeds a pre-defined threshold density $Sd_{thres}$, and/or if the overlap of $Sp(t)$ and $V_{CMC}$ exceeds a predefined threshold, such as for example $|Sp|/m$, where m is the threshold fraction of coverage. In some embodiments, the location probability volume $Sp(t)$ may be in the form of a 3D location probability function $Sp(t)=Sp(t, r_x, r_y, r_z)$ which magnitude at each location $(r_x, r_y, r_z)$ defines an estimate of a probability to find the target UAV at that location, and determining the firing criterion may include estimating a volume integral of a product $V_{CMC}(t, r_x, r_y, r_z) \cdot Sp(t, r_x, r_y, r_z)$. The location probability function $Sp(t, r_x, r_y, r_z)$ my be determined, for example, from the modified Kalman filter simulations while varying the control parameters u within their defined ranges.

In some embodiments the density and size of the CM volume $V_{CMC}$ may be varied for example by adjusting the CM deployment charge, in which case the density and volume of the CM cloud may vary inversely proportional to each other. Adjusting the ejection power of the CM deployment charge may be useful in dealing with different classes of offending UAVs. For example, a large octocopter UAV may require a lower density CM cloud but more volume than a smaller quadcopter for the same hit probability at the same speed.

Figure 13:
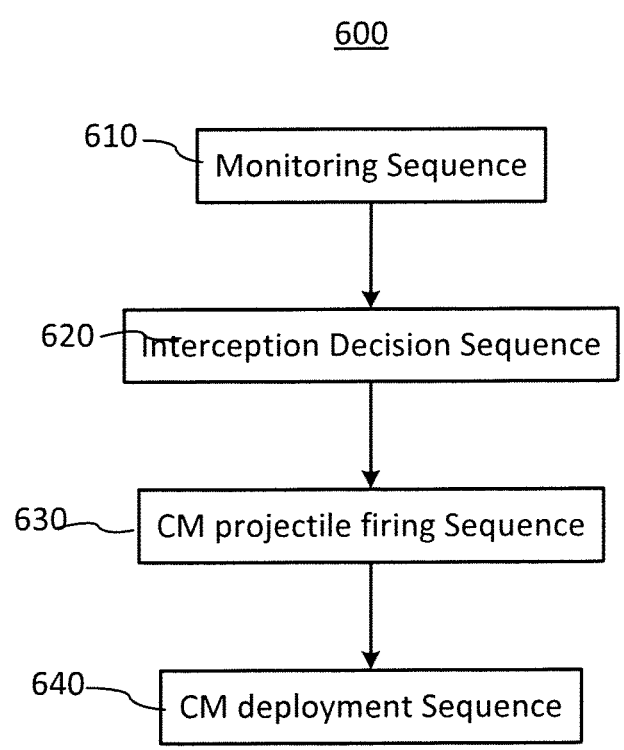
FIG. 13 is a flowchart illustrating a four-stage embodiment of a process for UAV interception.

Referring now to FIG. 13, in at least some embodiments the operation of a UAV intercepting system may include a monitoring sequence 610, an interception decision sequence 620, a CM projectile firing sequence 630, and a CM deployment sequence 640. In embodiments wherein the CM deployment projectile 120 is mounted on an interceptor UAV 190, the respective sequences may include at least some of the operations described hereinbelow.

In one embodiment the monitoring sequence 610 may include the following steps: a) detecting offending UAV, b) triangulating the offending UAV, c) tracking the offending UAV to determine UAV state X={r, v, a} representing location, velocity, and acceleration vectors, d) evaluating Countermeasure methods; e) making an interception decision, and f) activating the interception system.

Figure 14:
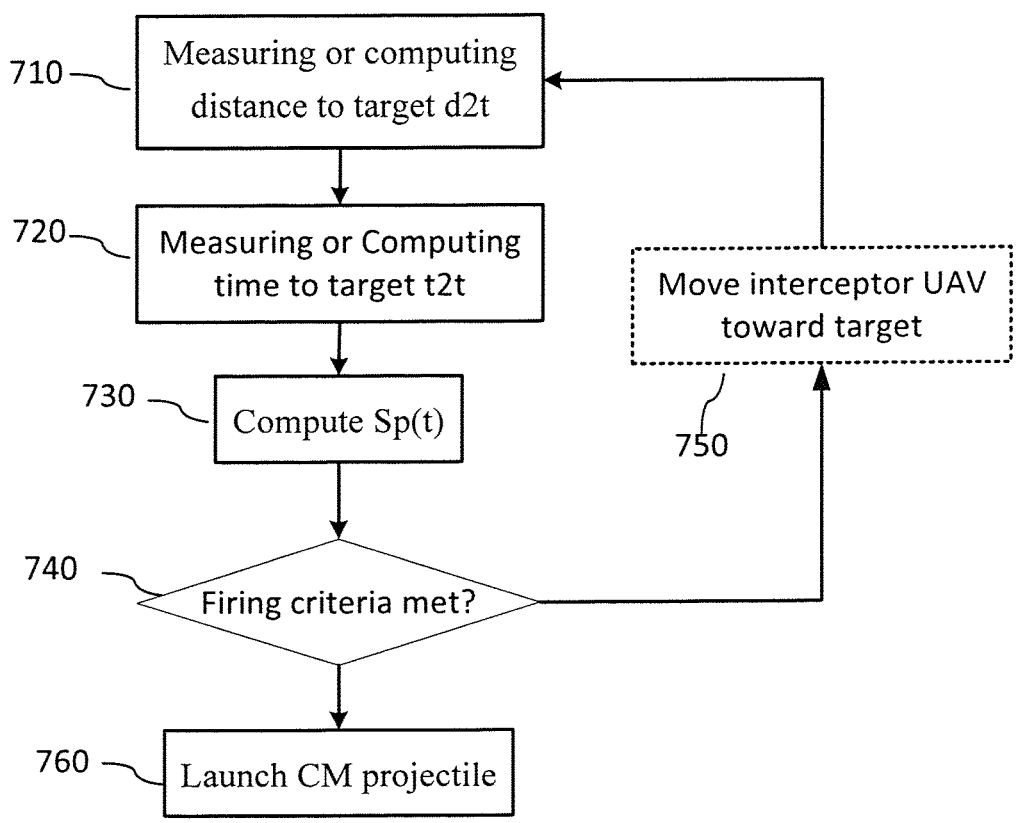
FIG. 14 is a flowchart of the interception decision stage of the process of FIG. 13.

With reference to FIG. 14, an interception decision sequence may include: estimating Distance-to-Target (d2t) at step 710; computing Time-to-Target value (t2t) or a range thereof (t2t [min, max], and a finite set of values in between) at step 720; at step 730, computing the location probability volume Sp(t) for a projected hit time $t_h=t_0+t2t$, where $t_0$ is the time of launching the projectile or the time of generating a launch command; at step 740 verifying if a firing criterion is met; if not, at step 750 an interceptor UAV, if available, may be moved toward the target, and the process returns to steps 710 and 720 of updating d2t and t2t values. When a firing criterion is met at step 740, a command to launch one or more CM projectiles toward the target UAV may be generated.

CM projectile firing sequence 630 may include: a) computing a target location of the countermeasure deployment; b) determining a suitable firing position and/or a firing velocity of the projectile; c) determining a suitable firing position and/or velocity of the interceptor UAV, when used; d) moving the interceptor UAV to the firing position, velocity; and, e) firing the projectile at the firing time $t_{fire}$.

In some embodiments where the CM delivery projectile is equipped with an active guidance system, it may use a modified proportional navigation to intercept the location probability volume Sp of the target UAV. Proportional navigation may be used to change the velocity vector, i.e. turn the projectile, in proportion to the change in the line-of-sight angle between the projectile and the offending UAV. In some embodiments a modified proportional navigation approach may use a geographic coordinate when the physical line of sight is not available.

In some embodiments the interception control system may continue tracking the target UAV with the CM projectile in flight to dynamically update a target location of the CM release, with a command to CM deployment issued when the projectile is within a hit zone, as defined for example by the location probability volume Sp(t), and releasing the CM objects at the target location.

In some embodiments the CM objects may be configured to enable capturing the offending UAV and steering thereof to a designated recovery location. This may be accomplished in a plurality of possible ways, for example using CM objects that are attached to a boom, which may be affixed to a steerable platform. In such embodiments the interceptor UAV carrying the boom may steer to the recovery location. In other embodiments the CM objects may be attached to a recovery parachute, which may be fashioned to operate as a paraglider, thereby enabling steering during descent under the control of a ground-based operator, or controlled autonomously.

In some embodiments ICS 200 or 200a may be implemented at least in part with one or more computing devices using one or more processors that are ground-based, for example are located at an agent vehicle 110 or a stationary ground-based platform. In some embodiments ICS 200 or 200a, or elements thereof, may be disposed in the interceptor UAV 190. In some embodiments a computing device on-board of the interceptor UAV may be configured to iteratively compute, in communication with the one or more UAV detection sensors, the projected path of the target UAV 140 relative to the interceptor UAV 190 and the location probability volume Sp(t) for the projected interception time. It may also generate the command to launch a CM projectile 120 when the computed location probability volume Sp(t) for the projected interception time satisfies a firing criterion such as for example described hereinabove.

In some embodiments ICS 200 or 200a may be implemented at least in part using a processor or processors disposed at the CM projectile 120, which may be self-guided. In some embodiments such a processor or processors may be configured to iteratively compute, in communication with the UAV detection sensors and with the projectile 120 in flight, the projected path of the target UAV relative to the CM projectile 120, and the UAV probability volume for the projected hit locations, and to generate the command to release the CM objects from the CM projectile at a target location, which may be determined by the on-board processor.

It will be appreciated that aspects of the system and method described hereinabove may relate also to UAV interception systems that use alternative countermeasures to intercept an UAV, including but not limited to nettings, projectiles intended to hit an offending UAV out of air by means of a mechanical impact or explosion force. When a plurality of CM objects is used, these objects may include pieces that are configured to stick to the blades of rotating propellers of the offending UAV and to cause them to stop rotating by increasing the aerodynamic drag on the propellers, now laden with the CM pieces, to a point where the propellers are unable to generate enough lift at their maximum torque and/or the torque limit of the propellers' motors is exceeded.

Thus, an aspect of the present disclosure provides a method for UAV interception that includes: a) detecting, by a computer system in communication with one or more UAV detection and tracking sensors, a target UAV entering a surveillance airspace; b) monitoring, by the computer system in communication with one or more UAV detection and tracking sensors, movements of the target UAV over a period of time to collect UAV location and movement data; c) computing, by the computer system, the projected path of the target UAV based on the UAV location and movement data; d) estimating, by the computer system, a projected interception location along the projected path where the target UAV may be intercepted by a countermeasure (CM), and a projected interception time t corresponding thereto; e) computing, by the computer system, a location probability volume Sp(t) for the target UAV that defines a three-dimensional (3D) range of probable locations of the target UAV at the projected interception time t; and, f) deploying the CM at one or more of the probable locations of the target UAV upon meeting a condition related to the location probability volume Sp(t).

In one embodiment the deploying may include releasing the plurality of CM objects into the air at a target location to form a cloud of the CM objects that descends through the projected path of the target UAV.

In one embodiment computing the probability volume Sp(t) may include simulating possible movements of the target UAV while varying at least one parameter representing a control input for the target UAV within a pre-defined range of control inputs.

In one embodiment the simulating may include computing a plurality of possible locations of the target UAV at the projected interception time t, each of the possible locations corresponding to a different value of the at least one parameter within the pre-defined range of control inputs. In one embodiment it may include computing the projected path of the target UAV using default values for a plurality of control inputs for the target UAV.

In one embodiment the method may include collecting, by the computer system, UAV classification data for classifying the target UAV into one of a plurality of pre-defined UAV classes to determine the range of the control inputs possible for the target UAV.

A further aspect of the present disclosure provides a system for intercepting a target UAV. The system may include: one or more UAV detection sensors configured to detect a target UAV in a surveillance area and to generate UAV location and movement data; a countermeasure (CM) delivery projectile comprising configured to deploy one or more CM objects into a projected path of the target UAV; and a projectile launch system configured to launch the CM delivery projectile toward a projected interception location of the target UAV responsive to a CM deployment command. The one or more CM objects may be configured to interfere with normal operation of one or more propellers of the target UAV so as to disrupt a lift or thrust characteristic of the target UAV. In one embodiment the system may include an interceptor UAV carrying the CM delivery projectile and the projectile launch system. In one embodiment it may include a UAV communication module configured to wirelessly communicate the CM deployment command to the interceptor UAV. In one embodiment it may include a charged container housing a plurality of CM objects and configured to disperse the CM objects in the air when activated, wherein the CM delivery projectile comprises a CM ejector configured to eject the container in response to a CM ejection command or to drop the plurality of CM objects for dispersing over a target location along the projected path of the UAV. In some embodiments the CM delivery projectile may include a CM ejector configured to select from two or more CM ejection options that differ in at least one parameter of the CM cloud.

In some embodiments the system may further include a computer-implemented interception control system (ICS), which in turn may include a tracking system (TS) configured to communicate with the one or more UAV detection sensors and to track movements of the target UAV over a period of time using the UAV location and movement data; a flight simulation system (FSS) configured to determine the projected interception location; and, a CM deployment control system configured to generate the CM deployment command for communicating to the projectile launch system.

In some embodiments the ICS may be in the form, or include, one or more computers programmed to: a) compute, and periodically update, the projected path of the target UAV said projected path based at least in part on the UAV location and movement data; b) determine, and periodically update, a time to target value t2t representing the time required for the CM objects to be delivered to a projected location of the target UAV; c) compute a location probability volume Sp(t) for the target UAV at a projected interception time $t=t_0+t2t$, where $t_0$ is a time instance at which a command for launching the CM delivery projectile, or to release the CM objects from the projectile, may be generated, wherein the location probability volume Sp(t) defines a three-dimensional (3D) range of probable locations of the target UAV at the projected interception time t; and, d) generating the command to launch the CM delivery projectile, or to release the CM objects from the CM delivery projectile, once the computed UAV probability volume Sp(t) for the projected interception time t satisfies a pre-determined firing criterion in relation to the cloud of CM objects.

It will be appreciated that the functionalities described hereinabove with reference to specific functional blocks in various block diagrams are by way of example only, and in other embodiments some or all of those functionalities may be performed by other functional blocks illustrated in the diagrams, or by separate functional units.

The above-described exemplary embodiments are intended to be illustrative in all respects, rather than restrictive, of the present invention. Thus the present invention is capable of many variations in detailed implementation that can be derived from the description contained herein by a person skilled in the art. For example, in some implementations a plurality of charged containers with CM objects may be disposed into the projected path of a target UAV to form multiple CM clouds. Containers with CM objects may be directly fired from the ground or ground-based vehicles. Still further, many other variations of the CM objects capable of interfering with normal operation of drone propellers and disrupting their lift capabilities may be envisioned. Furthermore, aspects of the method that relate to tracking an airborne target, determining a location probability volume therefor, using the modified Kalman filter process that accounts for the variability of control parameters, and to countermeasure deployment criteria, are not limited to system employing particular countermeasures described hereinabove, but may be generally employed in conjunction with other methods and systems for interception of airborne targets. All such and other variations and modifications are considered to be within the scope and spirit of the present invention as defined by the following claims.

I claim:

1. A method for intercepting an unmanned aerial vehicle (UAV) comprising:
    detecting a target UAV entering a surveillance airspace, and
    deploying a plurality of countermeasure (CM) objects into a projected path of the target UAV, the CM objects configured to interfere with operation of one or more propellers of the target UAV so as to disrupt the lift or thrust of the target UAV;
    wherein the plurality of CM objects comprises unattached elongated pieces of flexible material having a length greater than 10 centimeters that are capable of further elastically elongating by 250%, and
    wherein one or more of the plurality of CM objects stretch by 10% or more when between two rotating propellers of the one or more propellers of the target UAV or when between a rotating propeller of the one or more propellers of the target UAV and another structural feature of the target UAV when disrupting the lift or thrust of the target UAV.

2. The method of claim 1 wherein the deploying comprises releasing the plurality of CM objects into the air at a target location to form a cloud.

3. The method of claim 2 wherein the deploying comprises forming the cloud of the CM objects occupying an aerial volume with a minimum linear dimension of at least 1.5 meters.

4. The method of claim 1 wherein the unattached pieces have a shape of a ribbon.

5. The method of claim 4 wherein the unattached pieces comprise corrugated edges configured to facilitate being ensnared by the one or more propellers of the target UAV.

6. The method of claim 1 wherein the CM objects comprise pieces of a film or a sheet each having a surface area of at least 20% of an air intake area of one of the one or more propellers of the target UAV so as to at least partially block airflow to the one or more propellers of the target UAV when ensnared in a protective cage thereof.

7. The method of claim 1 wherein at least one of the CM objects comprises a piece of a first flexible material attached to a piece of a second flexible material, wherein the second flexible material provides a greater traction with the one or more propellers than the first flexible material.

8. The method of claim 7 wherein one of the first and second flexible material is characterized by a greater elasticity than the other of the first and second flexible material.

* * * * *